US012621341B2

(12) United States Patent
Nekoui et al.

(10) Patent No.: US 12,621,341 B2
(45) Date of Patent: May 5, 2026

(54) CONCURRENT FLOODING AND CLONING ATTACK MITIGATION

(71) Applicant: QUALCOMM Incorporated, San Diego, CA (US)

(72) Inventors: Mohammad Nekoui, Escondido, CA (US); Soumya Das, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 18/522,018

(22) Filed: Nov. 28, 2023

(65) Prior Publication Data

US 2025/0175494 A1     May 29, 2025

(51) Int. Cl.
*H04L 9/40* (2022.01)
*H04W 12/088* (2021.01)
*H04W 12/122* (2021.01)

(52) U.S. Cl.
CPC ....... *H04L 63/1458* (2013.01); *H04W 12/088* (2021.01); *H04W 12/122* (2021.01)

(58) Field of Classification Search
CPC ............. H04L 63/1458; H04L 63/1441; H04L 63/0254; H04L 63/0236; H04W 12/088; H04W 12/122; H04W 12/125
See application file for complete search history.

(56) References Cited

U.S. PATENT DOCUMENTS

| | | | | |
|---|---|---|---|---|
| 2010/0122344 A1* | 5/2010 | Wei | ..................... | H04L 63/1416 726/23 |
| 2022/0376813 A1 | 11/2022 | Nekoui et al. | | |
| 2022/0377512 A1* | 11/2022 | Nekoui | .................. | H04W 4/46 |
| 2024/0348614 A1* | 10/2024 | Goto | ...................... | H04L 63/10 |

FOREIGN PATENT DOCUMENTS

| | | |
|---|---|---|
| CN | 105208037 A | 12/2015 |
| CN | 209860928 U | 12/2019 |

OTHER PUBLICATIONS

F5 (Explanation of F5 DDoS threshold modes; retrieved Sep. 5, 2025 from: https://community.f5.com/kb/TechnicalArticles/explanation-of-f5-ddos-threshold-modes/286884?guideId=guide%3A4) (Year: 2020).*
Geetha (A Hybrid Scheme for Detecting Clone and Sybil Attacks in Wireless, retrieved Sep. 5, 2025 from: https://www.ripublication.com/ijaer10/ijaerv10n9_78.pdf) (Year: 2015).*

(Continued)

*Primary Examiner* — Brian F Shaw
(74) *Attorney, Agent, or Firm* — Polsinelli LLP

(57) ABSTRACT
A wireless communication process can include obtaining a wireless communication message associated with a source identifier (ID); determining that the source ID is associated with a flooding attack. The process can include filtering, based on determining that the source ID is associated with a flooding attack, wireless communication messages associated with the source ID. Filtering the wireless communication messages includes alternating between a first filtering state and a second filtering state. The first filtering state and the second filtering state are associated with different amounts of filtering.

30 Claims, 12 Drawing Sheets

(56)                 References Cited

OTHER PUBLICATIONS

Badruddoja S., et al., "Integrating DOTS With Blockchain Can Secure Massive IoT Sensors", 2020 IEEE International Parallel and Distributed Processing Symposium Workshops (IPDPSW), IEEE, May 18, 2020, pp. 937-946, XP033799356, Section VII-C, figure 10.

International Search Report and Written Opinion—PCT/US2024/056550—ISA/EPO—Jan. 28, 2025.

Jacoby G A., et al., "Mobile Host-Based Intrusion Detection and Attack Identification", IEEE Wireless Communications, Coordinated Science Laboratory, Dept. Electrical and Computer Engineering, University of Illinois at Urbana-Champaign, US, vol. 14, No. 4, Aug. 1, 2007, pp. 53-60, XP011191779, figure 4.

* cited by examiner

700

702

State 0

704

Flooding Attack And Message Handling Threshold Exceeded?

No

Yes

Yes

706

Create Filter List

708

Filter List Empty?

No

710

Message Handling Load Above Second Threshold?

No

Yes

712

State 1

714

State 2

1000

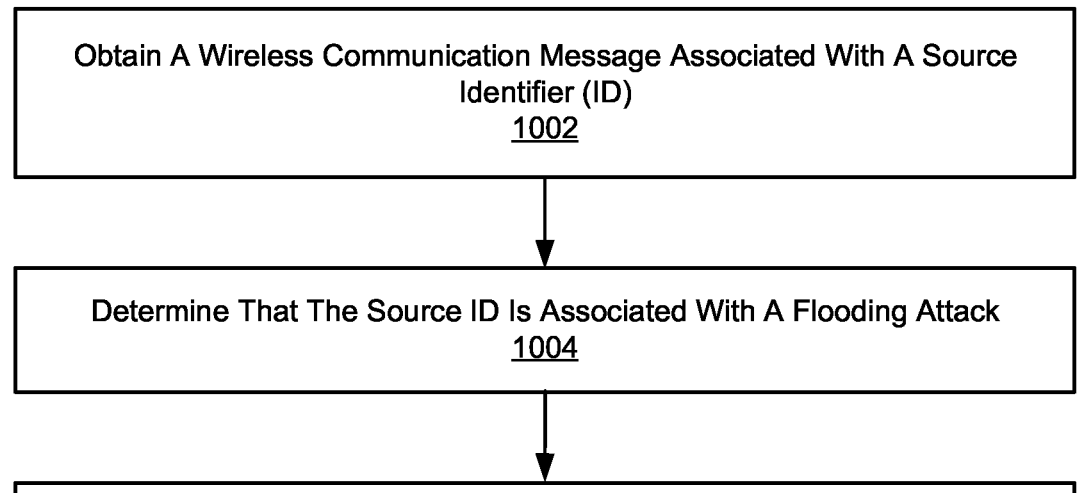

Obtain A Wireless Communication Message Associated With A Source
Identifier (ID)
1002

Determine That The Source ID Is Associated With A Flooding Attack
1004

Filter, Based On Determining That The Source ID Is Associated With A
Flooding Attack, Wireless Communication Messages Associated With The
Source ID, Wherein Filtering The Wireless Communication Messages
Comprises Alternating Between A First Filtering State And A Second Filtering
State, Wherein The First Filtering State And The Second Filtering State Are
Associated With Different Amounts Of Filtering
1006

FIG. 10

CONCURRENT FLOODING AND CLONING ATTACK MITIGATION

FIELD

The present disclosure generally relates to mitigation of attacks in wireless communication. For example, aspects of the present disclosure relate to mitigation of concurrent flooding and cloning attacks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise direct communication between devices, such as in V2X, vehicle-to-vehicle (V2V), and/or device-to-device (D2D) communication. There exists a need for further improvements in V2X, V2V, and/or D2D technology. These improvements may also be applicable to other multi-access technologies and the telecommunication standards that employ these technologies.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods, and computer-readable media for wireless communication. According to at least one example, a method is provided for wireless communication. The method includes: obtaining a wireless communication message associated with a source identifier (ID); determining that the source ID is associated with a flooding attack; and filtering, based on determining that the source ID is associated with a flooding attack, wireless communication messages associated with the source ID, wherein filtering the wireless communication messages comprises alternating between a first filtering state and a second filtering state, wherein the first filtering state and the second filtering state are associated with different amounts of filtering.

In another example, an apparatus for wireless communication is provided that includes at least one memory and at least one processor coupled to the at least one memory. The at least one processor is configured to: obtain a wireless communication message associated with a source identifier (ID); determine that the source ID is associated with a flooding attack; and filter, based on determining that the source ID is associated with a flooding attack, wireless communication messages associated with the source ID, wherein filtering the wireless communication messages comprises alternating between a first filtering state and a second filtering state, wherein the first filtering state and the second filtering state are associated with different amounts of filtering.

In another example, a non-transitory computer-readable medium is provided that has stored thereon instructions that, when executed by one or more processors, cause the one or more processors to: obtain a wireless communication message associated with a source identifier (ID); determine that the source ID is associated with a flooding attack; and filter, based on determining that the source ID is associated with a flooding attack, wireless communication messages associated with the source ID, wherein filtering the wireless communication messages comprises alternating between a first filtering state and a second filtering state, wherein the first filtering state and the second filtering state are associated with different amounts of filtering.

In another example, an apparatus for wireless communication is provided. The apparatus includes: means for obtaining a wireless communication message associated with a source identifier (ID); means for determining that the source ID is associated with a flooding attack; and means for filtering, based on determining that the source ID is associated with a flooding attack, wireless communication messages associated with the source ID, wherein filtering the wireless communication messages comprises alternating between a first filtering state and a second filtering state, wherein the first filtering state and the second filtering state are associated with different amounts of filtering.

According to at least one additional example, a method is provided for wireless communication. The method includes: obtaining a wireless communication message associated with a source ID; determining that a message load indicator is indicative of a filtering state transition, wherein the message load indicator is associated with the wireless communication message; and transitioning, based on determining that the message load indicator is indicative of the filtering state transition, from a first filtering state to a second filtering state, wherein the first filtering state and the second filtering state are associated with different amounts of filtering.

In another example, an apparatus for wireless communication is provided that includes at least one memory and at least one processor coupled to the at least one memory. The at least one processor is configured to: obtain a wireless communication message associated with a source ID; determine that a message load indicator is indicative of a filtering state transition, wherein the message load indicator is associated with the wireless communication message; and transition, based on determining that the message load indicator is indicative of the filtering state transition, from a first filtering state to a second filtering state, wherein the first filtering state and the second filtering state are associated with different amounts of filtering.

In another example, a non-transitory computer-readable medium is provided that has stored thereon instructions that, when executed by one or more processors, cause the one or more processors to: obtain a wireless communication message associated with a source ID; determine that a message load indicator is indicative of a filtering state transition, wherein the message load indicator is associated with the wireless communication message; and transition, based on determining that the message load indicator is indicative of the filtering state transition, from a first filtering state to a second filtering state, wherein the first filtering state and the second filtering state are associated with different amounts of filtering.

In another example, an apparatus for wireless communication is provided. The apparatus includes: means for obtaining a wireless communication message associated with a source ID; means for determining that a message load indicator is indicative of a filtering state transition, wherein the message load indicator is associated with the wireless communication message; and means for transitioning, based on determining that the message load indicator is indicative of the filtering state transition, from a first filtering state to a second filtering state, wherein the first filtering state and the second filtering state are associated with different amounts of filtering.

In some aspects, the apparatus is, includes, or is part of, a vehicle (e.g., an automobile, truck, etc., or a component or system of an automobile, truck, etc.) or a device or component of the vehicle, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a robotics device, or other device. In some aspects, the apparatus includes radio detection and ranging (radar) for capturing radio frequency (RF) signals. In some aspects, the apparatus includes one or more light detection and ranging (LIDAR) sensors, radar sensors, or other light-based sensors for capturing light-based (e.g., optical frequency) signals. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

This summary is not intended to identify key or essential features of the claimed subject matter, nor is it intended for use in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

Illustrative aspects of the present application are described in detail below with reference to the following figures:

FIG. 10 is a flow chart illustrating an example process for wireless communication, in accordance with some aspects of the present disclosure;

DETAILED DESCRIPTION

Figure 1:
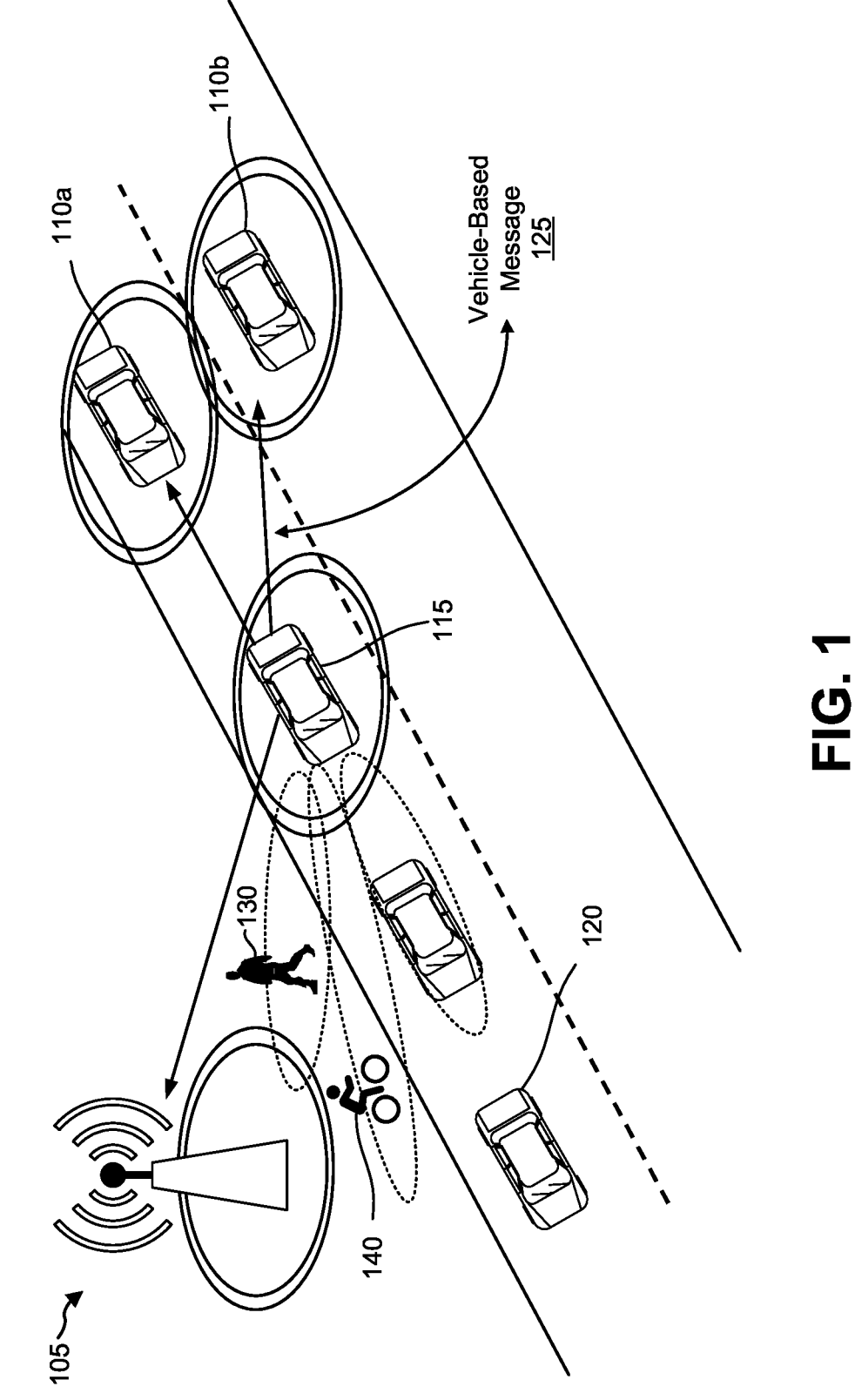
FIG. 1 is a diagram illustrating an example of various devices involved in wireless communications during a concurrent cloning and flooding attack by an attacker, in accordance with some aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Wireless communications systems are deployed to provide various telecommunication services, including telephony, video, data, messaging, broadcasts, among others. Wireless communications systems have developed through various generations. A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users.

Vehicles are an example of systems that can include wireless communications capabilities. For example, vehicles (e.g., automotive vehicles, autonomous vehicles, aircraft, maritime vessels, among others) can communicate with other vehicles and/or with other devices that have wireless communications capabilities. Wireless vehicle communication systems encompass vehicle-to-vehicle (V2V), vehicle-to-infrastructure (V2I), vehicle-to-network (V2N), and vehicle-to-pedestrian (V2P) communications, which are all collectively referred to as vehicle-to-everything (V2X) communications. V2X communications is a vehicular communication system that supports the wireless transfer of information from a vehicle to other entities (e.g., other vehicles, pedestrians with smart phones, equipped vulnerable road users (VRUs), such as bicyclists, and/or other traffic infrastructure) located within the traffic system that may affect the vehicle. The main purpose of the V2X technology is to improve road safety, fuel savings, and traffic efficiency.

The IEEE 802.11p Standard supports (uses) a dedicated short-range communications (DSRC) interface for V2X wireless communications. Characteristics of the IEEE 802.11p based DSRC interface include low latency and the use of the unlicensed 5.9 Gigahertz (GHz) frequency band. C-V2X was adopted as an alternative to using the IEEE 802.11p based DSRC interface for the wireless communications. The 5G Automotive Association (5GAA) supports the use of C-V2X technology. In some cases, the C-V2X technology uses Long-Term Evolution (LTE) as the underlying technology, and the C-V2X functionalities are based on the LTE technology. C-V2X includes a plurality of operational modes. One of the operational modes allows for direct wireless communication between vehicles over the LTE sidelink PC5 interface. Similar to the IEEE 802.11p based DSRC interface, the LTE C-V2X sidelink PC5 interface operates over the 5.9 GHz frequency band. Vehicle-based messages, such as Basic Safety Messages (BSMs) and Cooperative Awareness Messages (CAMs), which are application layer messages, are designed to be wirelessly broadcasted over the 802.11p based DSRC interface and the LTE C-V2X sidelink PC5 interface.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

In some cases, a network entity can be implemented in an aggregated or monolithic base station or server architecture, or alternatively, in a disaggregated base station or server architecture, and may include one or more of a central unit (CU), a distributed unit (DU), a radio unit (RU), a Near-Real Time (Near-RT) RAN Intelligent Controller (RIC), or a Non-Real Time (Non-RT) RIC. In some cases, a network entity can include a server device, such as a Multi-access Edge Compute (MEC) device. A base station or server (e.g., with an aggregated/monolithic base station architecture or disaggregated base station architecture) may operate according to one of several RATs in communication with UEs, road side units (RSUs), and/or other devices depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical TRP or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RSU is a device that can transmit and receive messages over a communications link or interface (e.g., a cellular-based sidelink or PC5 interface, an 802.11 or WiFi™ based Dedicated Short Range Communication (DSRC) interface, and/or other interface) to and from one or more UEs, other RSUs, and/or base stations. An example of messages that can be transmitted and received by an RSU includes vehicle-to-everything (V2X) messages, which are described in more detail below. RSUs can be located on various transportation infrastructure systems, including roads, bridges, parking lots, toll booths, and/or other infrastructure systems. In some examples, an RSU can facilitate communication between UEs (e.g., vehicles, pedestrian user devices, and/or other UEs) and the transportation infrastructure systems. In some implementations, a RSU can be in communication with a server, base station, and/or other system that can perform centralized management functions.

An RSU can communicate with a communications system of a UE. For example, an intelligent transport system (ITS) of a UE (e.g., a vehicle and/or other UE) can be used to generate and sign messages for transmission to an RSU and to validate messages received from an RSU. An RSU can communicate (e.g., over a PC5 interface, DSRC interface, etc.) with vehicles traveling along a road, bridge, or other infrastructure system in order to obtain traffic-related data (e.g., time, speed, location, etc. of the vehicle). In some cases, in response to obtaining the traffic-related data, the RSU can determine or estimate traffic congestion information (e.g., a start of traffic congestion, an end of traffic congestion, etc.), a travel time, and/or other information for a particular location. In some examples, the RSU can communicate with other RSUs (e.g., over a PC5 interface, DSRC interface, etc.) in order to determine the traffic-related data. The RSU can transmit the information (e.g., traffic congestion information, travel time information, and/or other information) to other vehicles, pedestrian UEs, and/or other UEs. For example, the RSU can broadcast or otherwise transmit the information to any UE (e.g., vehicle, pedestrian UE, etc.) that is in a coverage range of the RSU.

A radio frequency signal or "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

As previously mentioned, the V2X technology includes V2V communications, which can also be referred to as peer-to-peer communications. V2V communications allows for vehicles to directly wireless communicate with each other while on the road. With V2V communications, vehicles can gain situational awareness by receiving information regarding upcoming road dangers (e.g., unforeseen oncoming vehicles, accidents, and road conditions) from the other vehicles.

In a V2X communication system, information is transmitted from vehicle sensors (and other sources) through wireless links to allow the information to be communicated to other vehicles, pedestrians, VRUs, and/or traffic infrastructure. The information may be transmitted using one or more vehicle-based messages, such as cellular-vehicle-to-everything (C-V2X) messages, which can include Sensor Data Sharing Messages (SDSMs), BSMs, CAMs, Collective Perception Messages (CPMs), Decentralized Environmental Messages (DENMs), and/or other types of vehicle-based messages.

In some cases, an attacker may attempt to disrupt communication in a V2X communication system by performing a flooding attack. In some cases, a UE can determine that a flooding attack is underway when a total incoming message rate of messages received by the UE and originating from one or more flooding source IDs (e.g., source IDs of UEs) exceeds a cumulative message rate threshold for incoming messages to the UE. As used herein, a flooding source ID can be considered to be any source ID having a message rate for incoming messages from the source ID that exceeds a source-specific message rate threshold. As used herein, a UE subject to a flooding attack can be referred to as a flooding attack victim.

In some cases, an attacker may attempt to avoid being identified as a flooding attacker. For example, an attacker may attempt to avoid detection by cloning a source ID of an RSU and sending flooding messages that falsely indicate their source as the cloned source ID. As used herein, an RSU (or UE) that has its source ID cloned by an attacker can be considered to be a cloning victim. As used herein, a flooding attack performed by an attacker using a cloned source ID can be considered to be a concurrent cloning and flooding attack.

In some cases, flooding victims may respond to detecting a flooding attack by temporarily filtering messages from the one or more flooding source IDs. However, if a legitimate message from the cloning victim arrives at the flooding victim while the flooding victim is filtering messages from the cloned source ID, the flooding victim may miss critical information (e.g., sensor data) contained in messages from the cloning victim.

Accordingly, systems and techniques are needed for defending against flooding attacks that also prevents flooding victims from missing information contained in messages originating from cloning victims during a concurrent flooding and cloning attack.

Systems and techniques are described herein for mitigating concurrent cloning and flooding attacks. In some cases, the systems and techniques can include filtering of flooding messages from one or more attacking UEs.

In some cases, the systems and techniques can include alternating between intervals of ignoring messages from the one or more flooding source IDs and intervals of listening to messages from the one or more flooding source IDs. In some examples, different filtering states (e.g., states of a state machine) can include alternating between intervals of ignoring messages from the one or more flooding source IDs and intervals of listening to messages from the one or more flooding source identifiers. In some aspects, different filtering states can have different duty cycles of ignoring messages from the one or more flooding source IDs and intervals of listening to messages from the one or more flooding source IDs. In some cases, listening to messages from the one or more flooding source IDs during the intervals of listening to messages may allow for legitimate messages from a victim UE with a cloned source ID to be received.

In some implementations, the systems and techniques described herein can include determining whether a flooding attack is occurring based on a number of communications received during a particular time interval.

In some cases, the systems and techniques described herein can determine whether a transition between filtering states is needed at the end of an evaluation interval. In some examples, determining which filtering state to enter after an evaluation interval can include determining whether a message load indicator exceeded one or more message load thresholds during the evaluation interval. In some cases, one or more of the message load indicators may be used for a threshold determination of whether a flooding attack is ongoing. For example, a message load indicator may include, without limitation, a total number of incoming messages, a number of incoming messages from an individual source ID, a message verification rate, utilization of available message verification capacity, an operating temperature of a message handling component, or the like. In some aspects, when message load indicators indicate increasing incoming message rates, the systems and techniques described herein can increase filtering duty cycles of ignoring incoming messages from one or more flooding source IDs.

In some cases, determining whether message load indicators indicate increasing message loads can include comparing the message load indicators to message handling load thresholds. For example, a message load threshold may include, without limitation, a threshold number of incoming messages, a threshold number of incoming messages from an individual source ID, a message verification rate threshold, utilization of available message verification capacity threshold, an operating temperature threshold for a message handling component, or the like.

FIG. 1 is a diagram illustrating an example wireless communication configuration 100 of devices involved in wireless communications during a flooding attack, in accordance with some examples of the present disclosure. In some cases, the wireless communication configuration 100 can utilize the systems and techniques described herein to prevent and/or to reduce the likelihood of flooding victims missing legitimate messages from cloned source IDs of cloning victims during a concurrent cloning and flooding attack. In FIG. 1, the wireless communication configuration 100 is shown to include a plurality of equipped (e.g., V2X capable) network devices. The plurality of equipped network devices includes vehicles (e.g., automobiles) 110a, 110b and a roadside unit (RSU) 105. The plurality of equipped network devices may also include an attacker 115. In the illustrated example, the attacker is shown as a vehicle, however, an attacker 115 may include different types of equipped network devices. Also shown are a plurality of non-equipped network devices, which include a non-equipped vehicle 120, a pedestrian 130, and a VRU 140. The wireless communication configuration 100 may comprise more or less equipped network devices and/or more or less non-equipped network devices, than as shown in FIG. 1. In addition, the wireless communication configuration 100 may comprise more or less different types of equipped network devices (e.g., which may include equipped UEs) and/or more or less different types of non-equipped network devices (e.g., which may include non-equipped UEs) than as shown in FIG. 1. In addition, in one or more examples, the equipped network devices may be equipped with heterogeneous capability, which may include, but is not limited to, C-V2X/DSRC capability, 4G/5G cellular connectivity, GPS capability, camera capability, radar capability, and/or LIDAR capability.

The plurality of equipped network devices may be capable of performing V2X communications. In addition, at least some of the equipped network devices are configured to transmit and receive sensing signals for radar (e.g., RF sensing signals) and/or LIDAR (e.g., optical sensing signals) to detect nearby vehicles and/or objects. Additionally or alternatively, in some cases, at least some of the equipped network devices can be configured to detect nearby vehicles and/or objects using one or more cameras (e.g., by processing images captured by the one or more cameras to detect the vehicles/objects).

In some examples, some of the equipped network devices may have higher capability sensors (e.g., GPS receivers, cameras, RF antennas, and/or optical lasers and/or optical sensors) than other equipped network devices of the wireless communication configuration 100. For example, vehicle 110b may be a luxury vehicle and, as such, have more expensive, higher capability sensors than other vehicles that are economy vehicles. In one illustrative example, vehicle 110b may have higher capability camera (e.g., with higher resolution capabilities, higher frame rate capabilities, better lens, etc.) than the other equipped network devices in the wireless communication configuration 100.

During operation of the wireless communication configuration 100, the equipped network devices (e.g., RSU 105 and/or at least one of the vehicles 110a, 110b) may transmit and/or receive sensing signals (e.g., RF and/or optical signals) to sense and detect vehicles (e.g., vehicles 110a, 110b, attacker 115) and/or objects (e.g., VRU 140 and pedestrian 130) located within and surrounding the road. The equipped network devices (e.g., RSU 105 and/or at least one of the vehicles 110a, 110b,) may then use the sensing signals to determine characteristics (e.g., motion, dimensions, type, heading, and speed) of the detected vehicles and/or objects. The equipped network devices (e.g., RSU 105 and/or at least one of the vehicles 110a, 110b) may generate at least one vehicle-based message 125 (e.g., a V2X message, such as a SDSM, a BSM, a CAM, a CPM, and/or other type of message) including information related to the determined characteristics of the detected vehicles and/or objects.

The vehicle-based message 125 may include information related to the detected vehicle or object (e.g., a position of the vehicle or object, an accuracy of the position, a speed of the vehicle or object, a direction in which the vehicle or object is traveling, and/or other information related to the vehicle or object), traffic conditions (e.g., low speed and/or dense traffic, high speed traffic, information related to an accident, etc.), weather conditions (e.g., rain, snow, etc.), message type (e.g., an emergency message, a non-emergency or "regular" message), etc.), road topology (line-of-sight (LOS) or non-LOS (NLOS), etc.), any combination, thereof, and/or other information. In some examples, the vehicle-based message 125 may also include information regarding the equipped network device's preference to receive vehicle-based messages from other certain equipped network devices. In some cases, the vehicle-based message 125 may include the current capabilities of the equipped network device (e.g., vehicles 110a, 110b), such as the equipped network device's sensing capabilities (which can affect the equipped network device's accuracy in sensing vehicles and/or objects), processing capabilities, the equipped network device's thermal status (which can affect the vehicle's ability to process data), and the equipped network device's state of health.

In some aspects, the vehicle-based message 125 may include a dynamic neighbor list (also referred to as a Local Dynamic Map (LDM) or a dynamic surrounding map) for each of the equipped network devices (e.g., vehicles 110a, 110b and RSU 105). For example, each dynamic neighbor list can include a listing of all vehicles and/or objects that are located within a specific predetermined distance (or radius of distance) away from a corresponding equipped network device. In some cases, each dynamic neighbor list includes a mapping, which may include roads and terrain topology, of all of the vehicles and/or objects that are located within a specific predetermined distance (or radius of distance) away from a corresponding equipped network device. For example, a predetermined distance can include, without limitation, up to one hundred (100) yards, up to one thousand yards (1000), up to one mile, and/or any other predetermined distance. In one illustrative example, a distance (or radius of distance) between equipped network devices and/or objects can be determined based on position information for equipped network devices and/or objects included in vehicle-based messages 125 and a current position of an equipped network device generating the dynamic neighbor list.

In some cases, messages sent during operation of the wireless communication configuration 100 may be important for safety of vehicles 110a, 110b, pedestrians 130 and/or VRUs 140. Accordingly, it is important to maintain security of the wireless communication configuration 100 to prevent interference with wireless communications. One security concern involves over the air (OTA) attacks where an attacker 115 may attempt to transmit messages to attack equipped network devices such as vehicles 110a, 110b. For example, the attacker 115 may perform a flooding attack on one or more UEs (e.g., on-board units (OBUs) of the vehicles 110a, 110b). In one illustrative example, the attacker may transmit a large volume of messages to the UE to overwhelm a receiver of the UE. In some cases, filtering can be performed on sidelink medium access control (L2) addresses that transmit messages to the UE above a particular single source threshold message rate. In some examples, to circumvent the single source threshold message rate, the attacker 115 can send messages to the UE that appear to originate from multiple different source L2 addresses. In some implementations, the UE can implement filtering when a total message rate from all L2 addresses exceeds a cumulative message threshold. In one illustrative example, any source L2 address that exceeds the single source threshold message rate while the total message rate exceeds the cumulative message threshold may be filtered by the UE. In some cases, filtering the source L2 addresses can include filtering incoming messages from the filtered source L2 addresses for a predetermined time interval (e.g., a snooze interval).

In some cases, the attacker 115 may perform a cloning attack. For example, in a cloning attack, the attacker 115 can clone the L2 address of a first victim UE (e.g., RSU 105) and use the cloned address to transmit messages that a second victim UE (e.g., an OBU of a vehicle 110a, 110b) interprets as having arrived from the first victim UE. In some cases, the attacker 115 may use the cloned L2 address of the first victim UE of the cloning attack to conduct a concurrent flooding attack on a second victim UE. As noted above, in some implementations, the flooding by attacker 115 from the cloned L2 address of the first victim UE may result in the second victim UE filtering messages from the cloned L2 address. In some cases, filtering the cloned L2 address can result in both the flooding messages from the attacker 115 and legitimate messages from the first victim (e.g., RSU 105) being filtered. In some aspects, legitimate messages from the first victim may include critical messages intended for the second victim.

Additional aspects of the present disclosure are described in more detail below.

Figure 2:
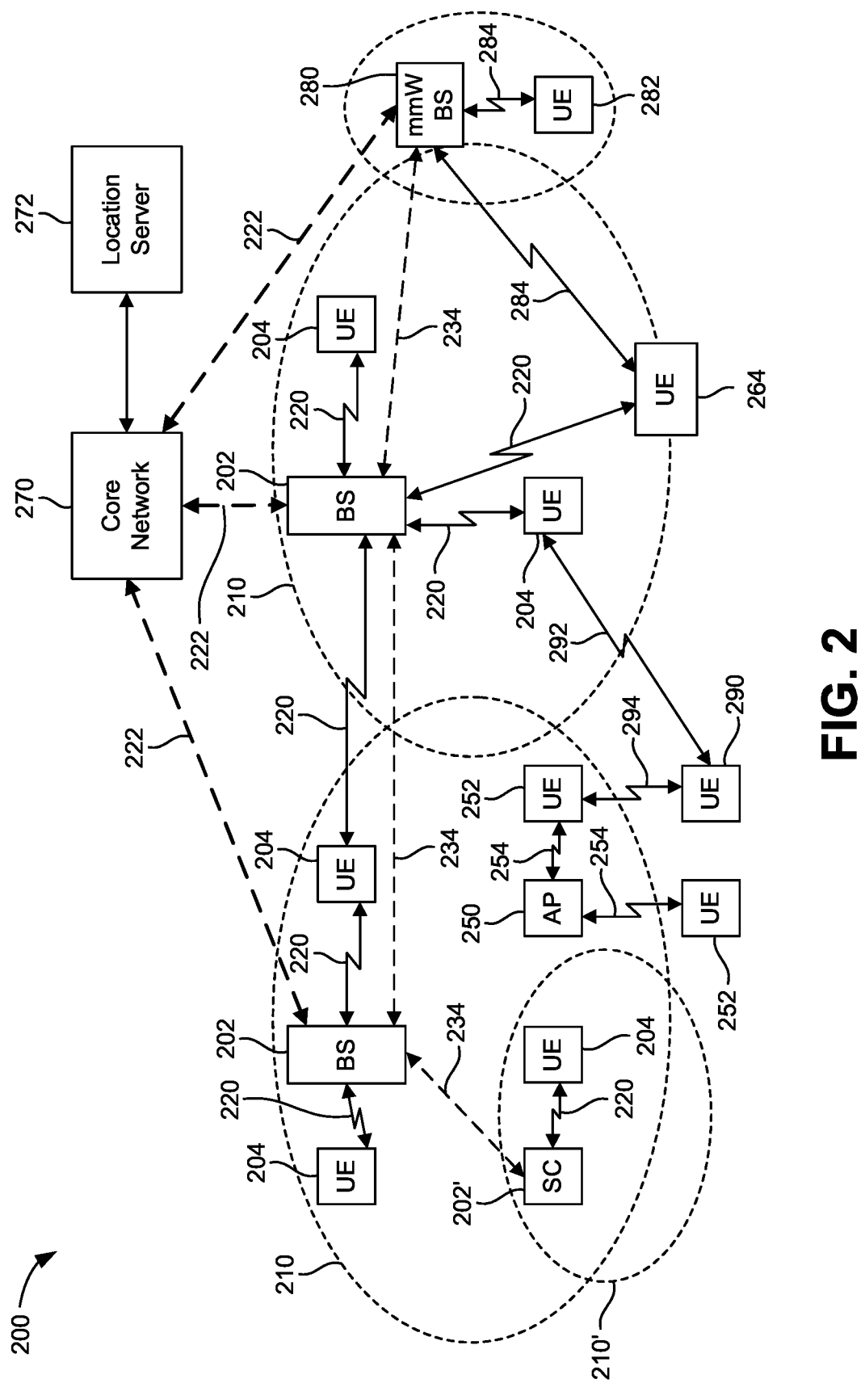
FIG. 2 is a diagram illustrating an example wireless communication configuration of devices involved in wireless communications during a concurrent cloning and flooding attack, in accordance with some aspects of the present disclosure.

According to various aspects, FIG. 2 illustrates an example wireless communications system 200. The wireless communications system 200 (which may also be referred to as a wireless wide area network (WWAN)) can include various base stations 202 and various UEs 204. In some aspects, the base stations 202 may also be referred to as "network entities" or "network nodes." One or more of the base stations 202 can be implemented in an aggregated or monolithic base station architecture. Additionally or alternatively, one or more of the base stations 202 can be implemented in a disaggregated base station architecture and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 202 can include macro cell base stations (high power cellular base stations) and/or small cell base stations (low power cellular base stations). In an aspect, the macro cell base station may include eNBs and/or ng-eNBs where the wireless communications system 200 corresponds to a long term evolution (LTE) network, or gNBs where the wireless communications system 200 corresponds to a NR network, or a combination of both, and the small cell base stations may include femtocells, picocells, microcells, etc.

The base stations 202 may collectively form a RAN and interface with a core network 270 (e.g., an evolved packet core (EPC) or a 5G core (5GC)) through backhaul links 222, and through the core network 270 to one or more location servers 272 (which may be part of core network 270 or may be external to core network 270). In addition to other functions, the base stations 202 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 202 may communicate with each other directly or indirectly (e.g., through the EPC or 5GC) over backhaul links 234, which may be wired and/or wireless.

The base stations 202 may wirelessly communicate with the UEs 204. Each of the base stations 202 may provide communication coverage for a respective geographic coverage area 210. In an aspect, one or more cells may be supported by a base station 202 in each coverage area 210. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 210.

While neighboring macro cell base station 202 geographic coverage areas 210 may partially overlap (e.g., in a handover region), some of the geographic coverage areas 210 may be substantially overlapped by a larger geographic coverage area 210. For example, a small cell base station 202' may have a coverage area 210' that substantially overlaps with the coverage area 210 of one or more macro cell base stations 202. A network that includes both small cell and macro cell base stations may be known as a heterogeneous network. A heterogeneous network may also include home eNBs (HeNBs), which may provide service to a restricted group known as a closed subscriber group (CSG).

The communication links 220 between the base stations 202 and the UEs 204 may include uplink (also referred to as reverse link) transmissions from a UE 204 to a base station 202 and/or downlink (also referred to as forward link) transmissions from a base station 202 to a UE 204. The communication links 220 may use MIMO antenna technology, including spatial multiplexing, beamforming, and/or transmit diversity. The communication links 220 may be through one or more carrier frequencies. Allocation of carriers may be asymmetric with respect to downlink and uplink (e.g., more or less carriers may be allocated for downlink than for uplink).

The wireless communications system 200 may further include a WLAN AP 250 in communication with WLAN stations (STAs) 252 via communication links 254 in an unlicensed frequency spectrum (e.g., 5 Gigahertz (GHz)). When communicating in an unlicensed frequency spectrum, the WLAN STAs 252 and/or the WLAN AP 250 may perform a clear channel assessment (CCA) or listen before talk (LBT) procedure prior to communicating in order to determine whether the channel is available. In some examples, the wireless communications system 200 can include devices (e.g., UEs, etc.) that communicate with one or more UEs 204, base stations 202, APs 250, etc. utilizing the ultra-wideband (UWB) spectrum. The UWB spectrum can range from 3.1 to 10.5 GHz.

The small cell base station 202' may operate in a licensed and/or an unlicensed frequency spectrum. When operating in an unlicensed frequency spectrum, the small cell base station 202' may employ LTE or NR technology and use the same 5 GHz unlicensed frequency spectrum as used by the WLAN AP 250. The small cell base station 202', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 200 may further include a millimeter wave (mmW) base station 280 that may operate in mmW frequencies and/or near mmW frequencies in communication with a UE 282. The mmW base station 280 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 200 millimeters. The super high frequency (SHF) band extends between 3 GHz and 30 GHz, also referred to as centimeter wave. Communications using the mmW and/or near mmW radio frequency band have high path loss and a relatively short range. The mmW base station 280 and the UE 282 may utilize beamforming (transmit and/or receive) over an mmW communication link 284 to compensate for the extremely high path loss and short range. Further, it will be appreciated that in alternative configurations, one or more base stations 202 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node or entity (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receiving beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain of other beams available to the receiver. This results in a stronger received signal strength, (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a network node or entity (e.g., a base station). The UE can then form a transmit beam for sending one or more uplink reference signals (e.g., uplink positioning reference signals (UL-PRS), sounding reference signal (SRS), demodulation reference signals (DMRS), PTRS, etc.) to that network node or entity (e.g., a base station) based on the parameters of the receive beam.

Note that a "downlink" beam may be either a transmit beam or a receive beam, depending on the entity forming it. For example, if a network node or entity (e.g., a base station) is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a network node or entity (e.g., a base station) is forming the uplink beam, it is an uplink receive beam, and if a UE is forming the uplink beam, it is an uplink transmit beam.

In 5G, the frequency spectrum in which wireless network nodes or entities (e.g., base stations 202/280, UEs 204/282) operate is divided into multiple frequency ranges, FR1 (from 450 to 6000 Megahertz (MHz)), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 204/282 and the cell in which the UE 204/282 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 204 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 204/282 in a cell may have different downlink primary carriers. The same is true for the uplink primary carriers. The network is able to change the primary carrier of any UE 204/282 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 2, one of the frequencies utilized by the macro cell base stations 202 may be an anchor carrier (or "PCell") and other frequencies utilized by the macro cell base stations 202 and/or the mmW base station 280 may be secondary carriers ("SCells"). In carrier aggregation, the base stations 202 and/or the UEs 204 may use spectrum up to Y MHz (e.g., 5, 10, 15, 20, 200 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 204/282 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 202 and/or a UE 204 is equipped with multiple receivers and/or transmitters. For example, a UE 204 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only. In this example, if the UE 204 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 204 is being served in band 'X' or band 'Y,' because of the separate "Receiver 2," the UE 204 can measure band 'Z' without interrupting the service on band 'X' or band 'Y.'

The wireless communications system 200 may further include a UE 264 that may communicate with a macro cell base station 202 over a communication link 220 and/or the mmW base station 280 over an mmW communication link 284. For example, the macro cell base station 202 may support a PCell and one or more SCells for the UE 264 and the mmW base station 280 may support one or more SCells for the UE 264.

The wireless communications system 200 may further include one or more UEs, such as UE 290, that connects indirectly to one or more communication networks via one or more device-to-device (D2D) peer-to-peer (P2P) links (referred to as "sidelinks"). In the example of FIG. 2, UE 290 has a D2D P2P link 292 with one of the UEs 204 connected to one of the base stations 202 (e.g., through which UE 290 may indirectly obtain cellular connectivity) and a D2D P2P link 294 with WLAN STA 252 connected to the WLAN AP 250 (through which UE 290 may indirectly obtain WLAN-based Internet connectivity). In an example, the D2D P2P links 292 and 294 may be supported with any well-known D2D RAT, such as LTE Direct (LTE-D), Wi-Fi Direct (Wi-Fi-D), Bluetooth®, and so on.

Figure 3:
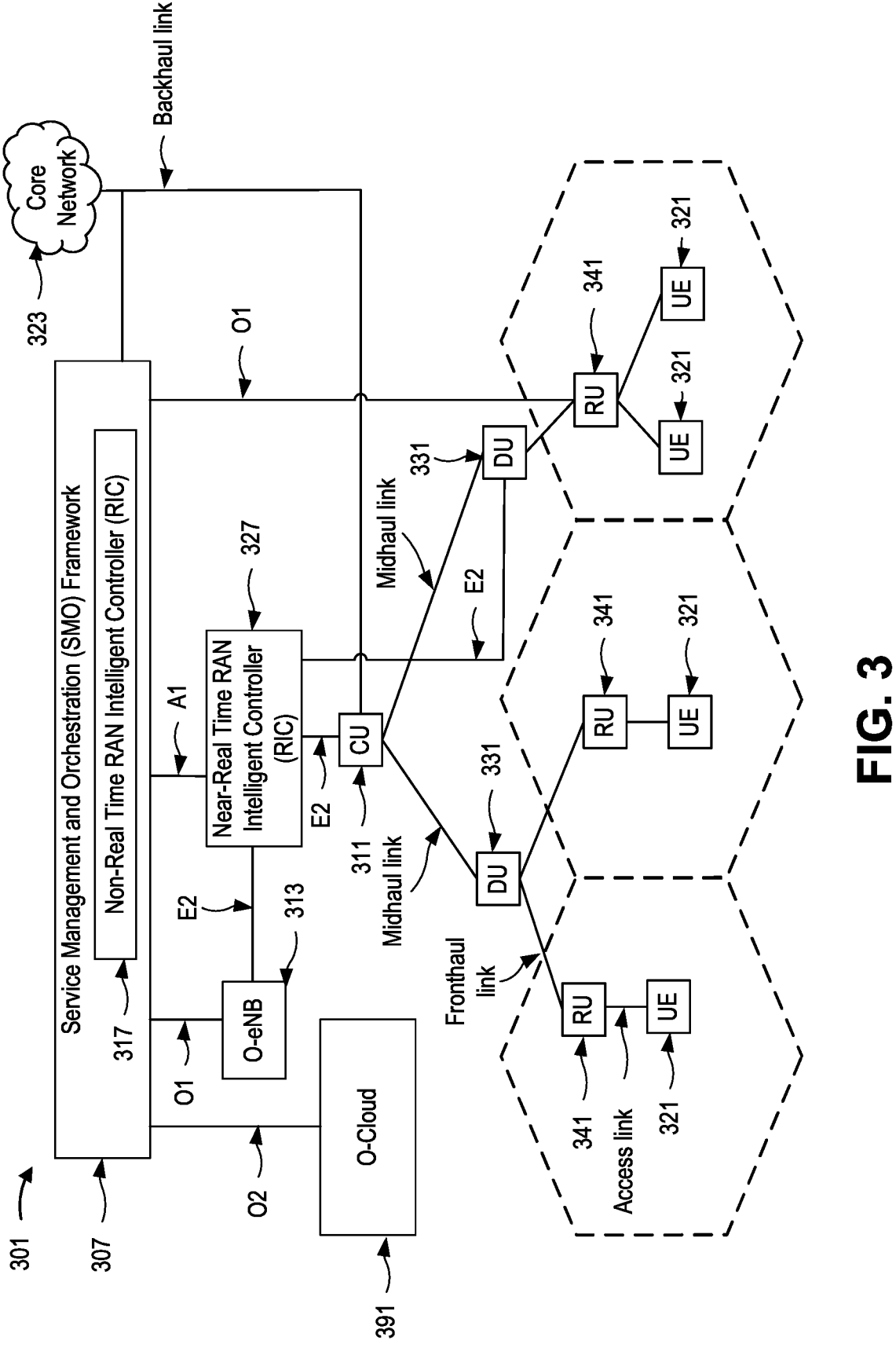
FIG. 3 is a diagram illustrating an example wireless communications system, in accordance with some aspects of the present disclosure.

FIG. 3 is a diagram illustrating an example of a disaggregated base station architecture, which may be employed by the disclosed system for event-based network and blockchain formation, in accordance with some examples. Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, AP, a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit VRU.

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

As previously mentioned, FIG. 3 shows a diagram illustrating an example disaggregated base station 301 architecture. The disaggregated base station 301 architecture may include one or more central units (CUs) 311 that can communicate directly with a core network 323 via a backhaul link, or indirectly with the core network 323 through one or more disaggregated base station units (such as a Near-Real Time (Near-RT) RAN Intelligent Controller (RIC) 327 via an E2 link, or a Non-Real Time (Non-RT) RIC 317 associated with a Service Management and Orchestration (SMO) Framework 307, or both). A CU 311 may communicate with one or more distributed units (DUs) 331 via respective midhaul links, such as an F1 interface. The DUs 331 may communicate with one or more radio units (RUs) 341 via respective fronthaul links. The RUs 341 may communicate with respective UEs 321 via one or more RF access links. In some implementations, the UE 321 may be simultaneously served by multiple RUs 341.

Each of the units, i.e., the CUs 311, the DUs 331, the RUs 341, as well as the Near-RT RICs 327, the Non-RT RICs 317 and the SMO Framework 307, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 311 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 311. The CU 311 may be configured to handle user plane functionality (i.e., Central Unit-User Plane (CU-UP)), control plane functionality (i.e., Central Unit-Control Plane (CU-CP)), or a combination thereof. In some implementations, the CU 311 can be logically split into one or more CU-UP units and one or more CU-CP units. The CU-UP unit can communicate bidirectionally with the CU-CP unit via an interface, such as the E1 interface when implemented in an O-RAN configuration.

The CU 311 can be implemented to communicate with the DU 331, as necessary, for network control and signaling.

The DU 331 may correspond to a logical unit that includes one or more base station functions to control the operation of one or more RUs 341. In some aspects, the DU 331 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 331 may further host one or more low PHY layers. Each layer (or module) can be implemented with an interface configured to communicate signals with other layers (and modules) hosted by the DU 331, or with the control functions hosted by the CU 311.

Lower-layer functionality can be implemented by one or more RUs 341. In some deployments, an RU 341, controlled by a DU 331, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 341 can be implemented to handle over the air (OTA) communication with one or more UEs 321. In some implementations, real-time and non-real-time aspects of control and user plane communication with the RU(s) 341 can be controlled by the corresponding DU 331. In some scenarios, this configuration can enable the DU(s) 331 and the CU 311 to be implemented in a cloud-based RAN architecture, such as a vRAN architecture.

The SMO Framework 307 may be configured to support RAN deployment and provisioning of non-virtualized and virtualized network elements. For non-virtualized network elements, the SMO Framework 307 may be configured to support the deployment of dedicated physical resources for RAN coverage requirements which may be managed via an operations and maintenance interface (such as an O1 interface). For virtualized network elements, the SMO Framework 307 may be configured to interact with a cloud computing platform (such as an open cloud (O-Cloud) 391) to perform network element life cycle management (such as to instantiate virtualized network elements) via a cloud computing platform interface (such as an O2 interface). Such virtualized network elements can include, but are not limited to, CUs 311, DUs 331, RUs 341 and Near-RT RICs 327. In some implementations, the SMO Framework 307 can communicate with a hardware aspect of a 4G RAN, such as an open eNB (O-eNB) 313, via an O1 interface. Additionally, in some implementations, the SMO Framework 307 can communicate directly with one or more RUs 341 via an O1 interface. The SMO Framework 307 also may include a Non-RT RIC 317 configured to support functionality of the SMO Framework 307.

The Non-RT RIC 317 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 327. The Non-RT RIC 317 may be coupled to or communicate with (such as via an A1 interface) the Near-RT RIC 327. The Near-RT RIC 327 may be configured to include a logical function that enables near-real-time control and optimization of RAN elements and resources via data collection and actions over an interface (such as via an E2 interface) connecting one or more CUs 311, one or more DUs 331, or both, as well as an O-eNB 313, with the Near-RT RIC 327.

In some implementations, to generate AI/ML models to be deployed in the Near-RT RIC 327, the Non-RT RIC 317 may receive parameters or external enrichment information from external servers. Such information may be utilized by the Near-RT RIC 327 and may be received at the SMO Framework 307 or the Non-RT RIC 317 from non-network data sources or from network functions. In some examples, the Non-RT RIC 317 or the Near-RT RIC 327 may be configured to tune RAN behavior or performance. For example, the Non-RT RIC 317 may monitor long-term trends and patterns for performance and employ AI/ML models to perform corrective actions through the SMO Framework 307 (such as reconfiguration via 01) or via creation of RAN management policies (such as A1 policies).

Figure 4:
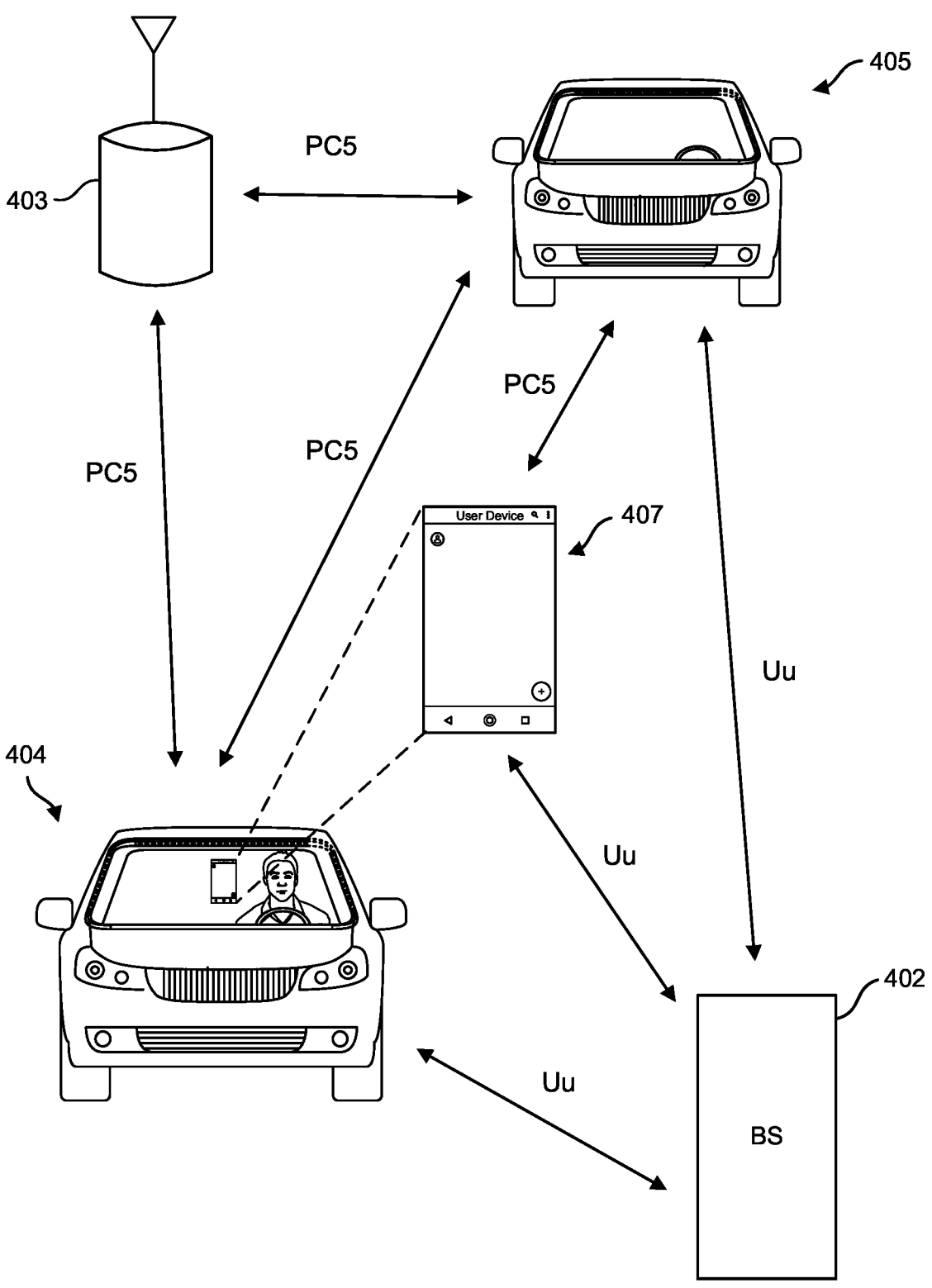
FIG. 4 is a diagram illustrating an example of a disaggregated base station architecture, which may be employed by the disclosed system for concurrent cloning and flooding attack mitigation, in accordance with some aspects of the present disclosure.

FIG. 4 illustrates examples of different communication mechanisms used by various UEs. In one example of sidelink communications, FIG. 4 illustrates a vehicle 404, a vehicle 405, and an RSU 403 communicating with each other using PC5, DSRC, or other device to device direct signaling interfaces. In addition, the vehicle 404 and the vehicle 405 may communicate with a base station (BS) 402 using a network (Uu) interface. The BS 402 can include a gNB in some examples. FIG. 4 also illustrates a user device 407 communicating with the BS 402 using a network (Uu) interface. As described below, functionalities can be transferred from a vehicle (e.g., vehicle 404) to a user device (e.g., user device 407) based on one or more characteristics or factors (e.g., temperature, humidity, etc.). In one illustrative example, V2X functionality can be transitioned from the vehicle 404 to the user device 407, after which the user device 407 can communicate with other vehicles (e.g., vehicle 405) over a PC5 interface (or other device to device direct interface, such as a DSRC interface), as shown in FIG. 4.

While FIG. 4 illustrates a particular number of vehicles (e.g., two vehicles 404 and 405) communicating with each other and/or with RSU 403, BS 402, and/or user device 407, the present disclosure is not limited thereto. For instance, tens or hundreds of such vehicles may be communicating with one another and/or with RSU 403, BS 402, and/or user device 407. At any given point in time, each such vehicle, RSU 403, BS 402, and/or user device 407 may transmit various types of information as messages to other nearby vehicles resulting in each vehicle (e.g., vehicles 404 and/or 405), RSU 403, BS 402, and/or user device 407 receiving hundreds or thousands of messages from other nearby vehicles, RSUs, base stations, and/or other UEs per second.

While PC5 interfaces are shown in FIG. 4, the various UEs (e.g., vehicles, user devices, etc.) and RSU(s) can communicate directly using any suitable type of direct interface, such as an 802.11 DSRC interface, a Bluetooth™ interface, and/or other interface. For example, a vehicle can communicate with a user device over a direct communications interface (e.g., using PC5 and/or DSRC), a vehicle can communicate with another vehicle over the direct communications interface, a user device can communicate with another user device over the direct communications interface, a UE (e.g., a vehicle, user device, etc.) can communicate with an RSU over the direct communications interface, an RSU can communicate with another RSU over the direct communications interface, and the like.

Figure 5:
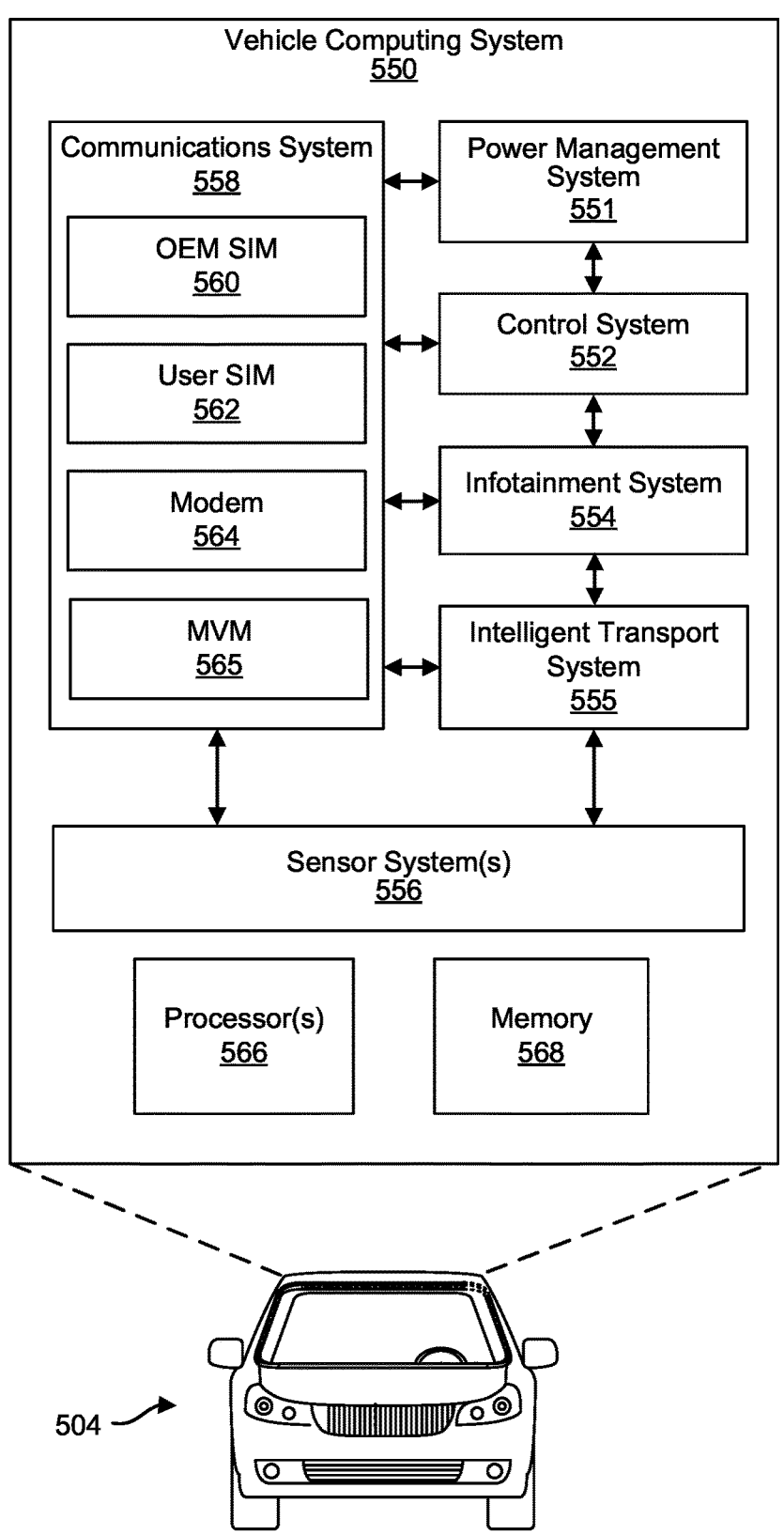
FIG. 5 is a block diagram illustrating an example of a computing system of a vehicle, in accordance with some aspects of the present disclosure.

FIG. 5 is a block diagram illustrating an example a vehicle computing system 550 of a vehicle 504. The vehicle 504 is an example of a UE that can communicate with a network (e.g., an eNB, a gNB, a positioning beacon, a location measurement unit, and/or other network entity) over a Uu interface and with other UEs using V2X communications over a PC5 interface, a C-V2X interface, or other device to device direct interface, such as a DSRC interface). As shown, the vehicle computing system 550 can include at least a power management system 551, a control system 552, an infotainment system 554, an intelligent transport system (ITS) 555, one or more sensor systems 556, and a communications system 558. In some cases, the vehicle computing system 550 can include or can be implemented using any type of processing device or system, such as one or more central processing units (CPUs), digital signal processors (DSPs), application specific integrated circuits (ASICs), field programmable gate arrays (FPGAs), application processors (APs), graphics processing units (GPUs), vision processing units (VPUs), Neural Network Signal Processors (NSPs), microcontrollers, dedicated hardware, any combination thereof, and/or other processing device or system.

The control system 552 can be configured to control one or more operations of the vehicle 504, the power management system 551, the computing system 550, the infotainment system 554, the ITS 555, and/or one or more other systems of the vehicle 504 (e.g., a braking system, a steering system, a safety system other than the ITS 555, a cabin system, and/or other system). In some examples, the control system 552 can include one or more electronic control units (ECUs). An ECU can control one or more of the electrical systems or subsystems in a vehicle. Examples of specific ECUs that can be included as part of the control system 552 include an engine control module (ECM), a powertrain control module (PCM), a transmission control module (TCM), a brake control module (BCM), a central control module (CCM), a central timing module (CTM), among others. In some cases, the control system 552 can receive sensor signals from the one or more sensor systems 556 and can communicate with other systems of the vehicle computing system 550 to operate the vehicle 504.

The vehicle computing system 550 also includes a power management system 551. In some implementations, the power management system 551 can include a power management integrated circuit (PMIC), a standby battery, and/or other components. In some cases, other systems of the vehicle computing system 550 can include one or more PMICs, batteries, and/or other components. The power management system 551 can perform power management functions for the vehicle 504, such as managing a power supply for the computing system 550 and/or other parts of the vehicle. For example, the power management system 551 can provide a stable power supply in view of power fluctuations, such as based on starting an engine of the vehicle. In another example, the power management system 551 can perform thermal monitoring operations, such as by checking ambient and/or transistor junction temperatures. In another example, the power management system 551 can perform certain functions based on detecting a certain temperature level, such as causing a cooling system (e.g., one or more fans, an air conditioning system, etc.) to cool certain components of the vehicle computing system 550 (e.g., the control system 552, such as one or more ECUs), shutting down certain functionalities of the vehicle computing system 550 (e.g., limiting the infotainment system 554, such as by shutting off one or more displays, disconnecting from a wireless network, etc.), among other functions.

The vehicle computing system 550 further includes a communications system 558. The communications system 558 can include both software and hardware components for transmitting signals to and receiving signals from a network (e.g., a gNB or other network entity over a Uu interface) and/or from other UEs (e.g., to another vehicle or UE over a PC5 interface, WiFi interface (e.g., DSRC), Bluetooth™ interface, and/or other wireless and/or wired interface). For example, the communications system 558 is configured to transmit and receive information wirelessly over any suitable wireless network (e.g., a 3G network, 4G network, 5G network, WiFi network, Bluetooth™ network, and/or other network). The communications system 558 includes various components or devices used to perform the wireless communication functionalities, including an original equipment manufacturer (OEM) subscriber identity module (referred to as a SIM or SIM card) 560, a user SIM 562, and a modem 564. While the vehicle computing system 550 is shown as having two SIMs and one modem, the computing system 550 can have any number of SIMs (e.g., one SIM or more than two SIMs) and any number of modems (e.g., one modem, two modems, or more than two modems) in some implementations.

A SIM is a device (e.g., an integrated circuit) that can securely store an international mobile subscriber identity (IMSI) number and a related key (e.g., an encryption-decryption key) of a particular subscriber or user. The IMSI and key can be used to identify and authenticate the subscriber on a particular UE. The OEM SIM 560 can be used by the communications system 558 for establishing a wireless connection for vehicle-based operations, such as for conducting emergency-calling (eCall) functions, communicating with a communications system of the vehicle manufacturer (e.g., for software updates, etc.), among other operations. The OEM SIM 560 can be important for the OEM SIM to support critical services, such as eCall for making emergency calls in the event of a car accident or other emergency. For instance, eCall can include a service that automatically dials an emergency number (e.g., "9-1-1" in the United States, "1-1-2" in Europe, etc.) in the event of a vehicle accident and communicates a location of the vehicle to the emergency services, such as a police department, fire department, etc.

The user SIM 562 can be used by the communications system 558 for performing wireless network access functions in order to support a user data connection (e.g., for conducting phone calls, messaging, Infotainment related services, among others). In some cases, a user device of a user can connect with the vehicle computing system 550 over an interface (e.g., over PC5, Bluetooth™, WiFI™ (e.g., DSRC), a universal serial bus (USB) port, and/or other wireless or wired interface). Once connected, the user device can transfer wireless network access functionality from the user device to communications system 558 the vehicle, in which case the user device can cease performance of the wireless network access functionality (e.g., during the period in which the communications system 558 is performing the wireless access functionality). The communications system 558 can begin interacting with a base station to perform one or more wireless communication operations, such as facilitating a phone call, transmitting and/or receiving data (e.g., messaging, video, audio, etc.), among other operations. In such cases, other components of the vehicle computing system 550 can be used to output data received by the communications system 558. For example, the infotainment system 554 (described below) can display video received by the communications system 558 on one or more displays and/or can output audio received by the communications system 558 using one or more speakers.

A modem is a device that modulates one or more carrier wave signals to encode digital information for transmission, and demodulates signals to decode the transmitted information. The modem 564 (and/or one or more other modems of the communications system 558) can be used for communication of data for the OEM SIM 560 and/or the user SIM 562. In some examples, the modem 564 can include a 4G (or LTE) modem and another modem (not shown) of the communications system 558 can include a 5G (or NR) modem. In some examples, the communications system 558 can include one or more Bluetooth™ modems (e.g., for Bluetooth™ Low Energy (BLE) or other type of Bluetooth communications), one or more WiFi™ modems (e.g., for DSRC communications and/or other WiFi communications), wideband modems (e.g., an ultra-wideband (UWB) modem), any combination thereof, and/or other types of modems.

In some cases, the modem 564 (and/or one or more other modems of the communications system 558) can be used for performing V2X communications (e.g., with other vehicles for V2V communications, with other devices for D2D communications, with infrastructure systems for V2I communications, with pedestrian UEs for V2P communications, etc.). In some examples, the communications system 558 can include a V2X modem used for performing V2X communications (e.g., sidelink communications over a PC5 interface or DSRC interface), in which case the V2X modem can be separate from one or more modems used for wireless network access functions (e.g., for network communications over a network/Uu interface and/or sidelink communications other than V2X communications).

In some implementations, the communications system 558 can include a message verification module (MVM) 565. In some cases, the MVM can be used to verify incoming messages received by the communications system 558 by one or more UEs (e.g., vehicle 110a, 110b, RSU 105, attacker 115 of FIG. 1).

In some cases, the MVM 565 maintain a database of equipped UEs (e.g., vehicles 110a, 110b, RSU 105 of FIG. 1) that are victims of a cloning attack (e.g., cloning victim UEs). In some cases, filtering messages from the source ID of a UE under a cloning attack may cause legitimate messages from the cloning victim UE to be missed. In some implementations, the database of equipped UEs can be maintained locally by the MVM 565. In some examples, the MVM 565 can obtain crowdsourced information to include in the database of equipped UEs. Table 1 below provides an illustrative example of entries that can be included in a database of equipped UEs.

TABLE 1

| | Location | Source ID | PSID | Visit Count | Observe Count |
|---|---|---|---|---|---|
| RSU Observed | Precise Location | Observed Source ID | Observed PSID | Optional | Optional |
| RSU Not Observed | Macro-location | −1 | N/A | −1 | Optional |
| OBU Observed | Macro-location | N/A | Optional | Visits to macro-location | Flooding attacks observed |

As illustrated in the example database of equipped UEs of Table 1, the database can include, without limitation, information about observed RSUs, information about macro-locations where no RSU has been observed, and/or information about macro-locations visited by mobile equipped UEs (e.g., OBUs of vehicles 110a, 110b of FIG. 1). In some cases, if an RSU is observed, the MVM 565 can store a precise location, source ID, and provider service ID (PSID) in the database. In some aspects, the MVM 565 can optionally store a visit count (e.g., a number of times the RSU at the precise location has been visited) and/or an observation count (e.g., a number of times a cloning/flooding attack was detected during those visits). In some implementations, RSUs may have static source IDs (e.g., L2 IDs) and if equipped UEs experience a flooding attack from the same source ID as an RSU stored in the database, the equipped UEs can determine that the RSU is a victim of a cloning attack. In some cases, the equipped UEs may stop filtering the source ID of the RSU in the vicinity of the stored precise location to receive messages from the RSU even when a concurrent cloning and flooding attack is taking place. In some cases, the source ID of an RSU may not be static, and including visit count and observation count may be useful to verify that a particular RSU is present at the precise location.

In some examples, if a macro-location (e.g., an intersection) is visited and no RSU is observed at the macro-location, the MVM 565 can store the macro-location as well as populating one or more fields in the database with values to indicate that no RSU was observed at the macro-location. In one illustrative example, the source ID and visit count values can be set to a value of −1, NULL, False, or the like. In some cases, the MVM 565 can optionally store the observation count for the macro-location.

In some cases, information about macro-locations observed by mobile equipped UEs (e.g., OBUs of vehicles 110a, 110b) can also be stored in the database. In one illustrative example, the macro-location of the OBU, visit count, and observation count can be stored in the database. In some implementations, the PSID can optionally be stored in the database. In some aspects, an approaching vehicle with access to the database (e.g., through crowdsourcing) can determine how likely it is for an observed concurrent cloning and flooding attack to be ongoing at the macro-location. In some examples the equipped UEs may stop filtering the source ID of a cloning victim UE at the macro-location. In some cases, the MVM 565 may decide to disable filtering of the source ID of the cloning victim UE (e.g., an RSU) to allow receipt of important messages from mobile equipped UEs. In one illustrative example, the MVM 565 may disable filtering of the source ID for critical safety messages (e.g., from an OBU of a vehicle).

In some cases, the MVM 565 can determine whether a flooding attack is underway by determining that a cumulative incoming message rate of messages received by the MVM and originating from one or more flooding source IDs (e.g., source IDs of UEs) exceeds a total message rate threshold for incoming messages to the MVM.

In some cases, an attacker may attempt to avoid being identified as a flooding attacker. For example, an attacker may attempt to avoid detection by cloning a source ID of a UE (e.g., an RSU) and sending flooding messages that falsely indicate their source as the cloned source ID (e.g., a cloning victim).

In some examples, the MVM 565 can have a verification capacity (e.g., a maximum rate for verifying incoming messages). In some cases, a large number of incoming messages to the MVM 565 (e.g., from a flooding attack) can cause the message verification rate of the MVM to be at or near its capacity to verify messages. As used herein, the capacity of the MVM to verify messages can also be referred to as verification capacity, message verification capacity, or MVM verification capacity. As used herein, an indicator of the amount (e.g., a percentage) of the capacity of the MVM 565 to verify messages that is used to verify messages can be referred to as utilization, MVM utilization, utilization of available message verification capacity. In some cases, the MVM 565 can compare the utilization of the MVM to a utilization threshold to determine whether the message verification rate of the MVM is at or near its capacity to verify messages.

In some examples, a large number of incoming messages (e.g., from a flooding attack) to the MVM 565 can cause an operating temperature (e.g., a junction temperature) of the MVM to increase. In some cases, if the operating temperature increases above an operating temperature threshold (also referred to herein as the MVM operating temperature threshold), the MVM 565 may become damaged and/or malfunction.

In some cases, the operating temperature of the MVM 565 can exceed the operating temperature threshold when the utilization of the MVM does not exceed the utilization threshold. Similarly, in some cases, the operating temperature of the MVM 565 can remain below the operating temperature threshold when the message verification rate of the MVM exceeds the utilization threshold. As used herein, a message load threshold of the MVM 565 can refer to the utilization threshold, the operating temperature threshold, and/or any combination thereof.

In some implementations, the utilization of available message verification capacity, the operation temperature, and/or any combination thereof can be used by the MVM 565 as message load indicators to select between a non-filtering state (e.g., processing all incoming messages regardless of source ID) and one or more filtering state (e.g., ignoring incoming messages from specific source IDs during specified filtering intervals). In some cases, the MVM 565 can transition between the non-filtering state and any of the one or more filtering states. In some cases, the MVM 565 can generate, update, store, and/or access a filter list including source IDs to be filtered during any of the one or more filtering states.

Figure 6A:
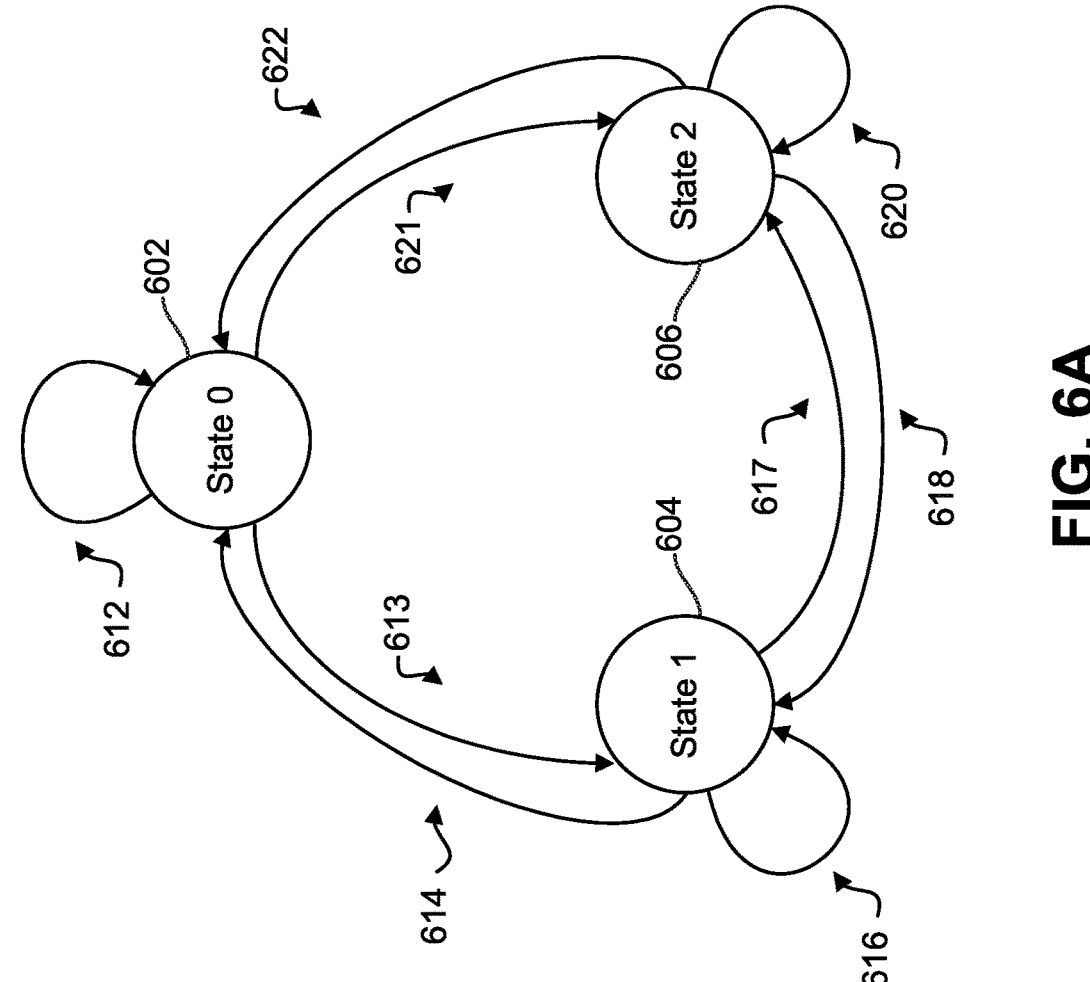
FIG. 6A is a flow chart illustrating an example concurrent cloning and flooding attack mitigation state machine, in accordance with some aspects of the present disclosure.
Figure 6B:
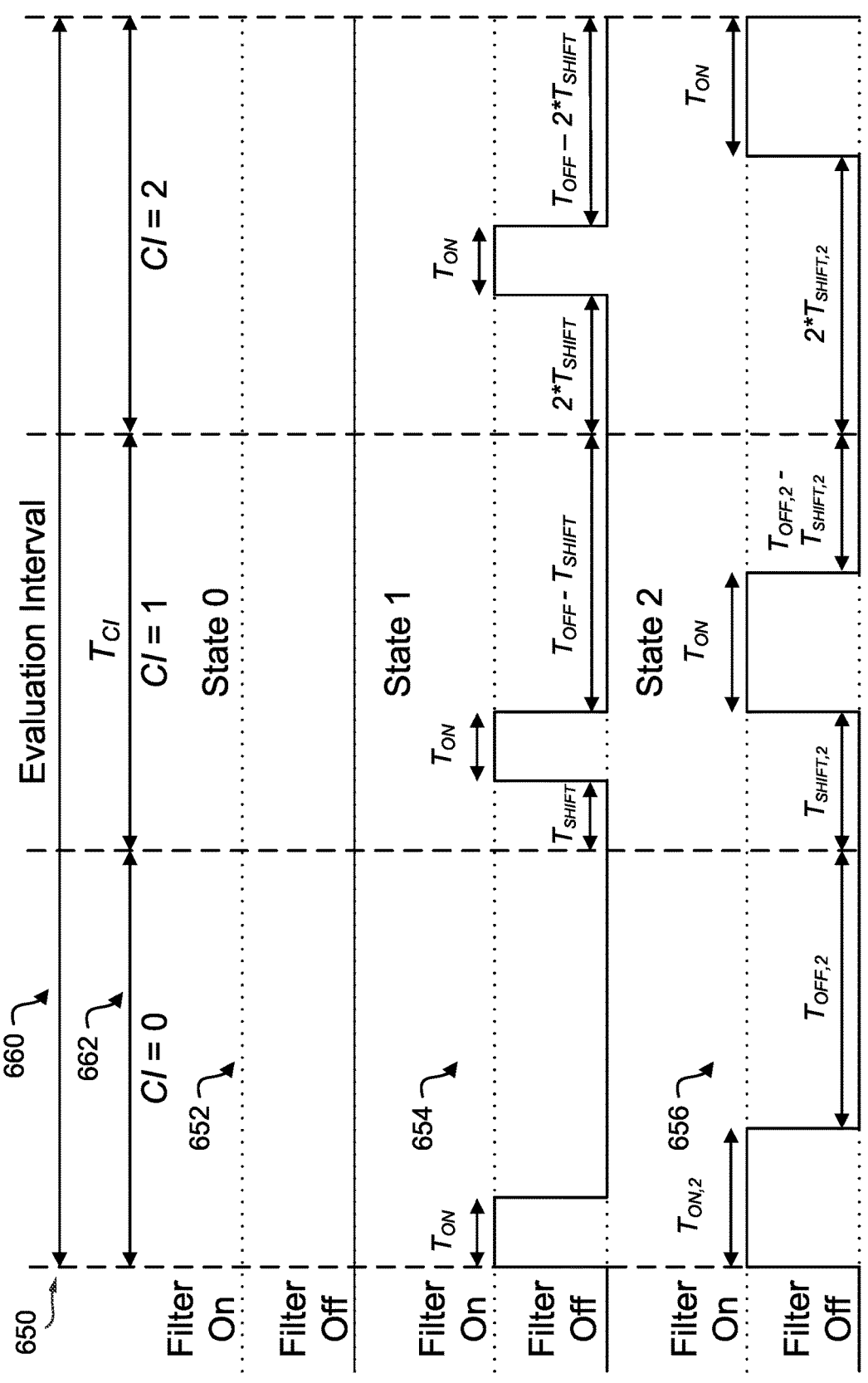
FIG. 6B is a diagram illustrating waveforms illustrative of filtering activity during different states of the concurrent cloning and flooding attack mitigation state machine of FIG. 6A, in accordance with some aspects of the present disclosure.

FIG. 6A is a diagram illustrating an example concurrent cloning and flooding attack mitigation state machine 600. FIG. 6B is a diagram illustrating waveforms 650 illustrative of filtering activity during different states of the concurrent cloning and flooding attack mitigation state machine of FIG. 6A. In some examples, the concurrent cloning and flooding attack mitigation state machine 600 can be implemented by the MVM 565 of FIG. 5.

In the illustrated example of FIG. 6A, the concurrent cloning and flooding attack mitigation state machine 600 includes three states: state 0 602, state 1 604, and state 2 606. In some cases, the concurrent cloning and flooding attack mitigation state machine 600 can determine whether to transition to another state or remain in a current state of the concurrent cloning and flooding attack mitigation state machine 600.

For example, if the state machine determines to remain in a current state, return to state 0 612, return to state 1 616, or return to state 2 620 paths may be taken. If the state machine determines to transition from state 0 to state 1, the path 613 may be taken. If the state machine determines to transition from state 1 to state 0, the path 614 may be taken. If the state machine determines to transition from state 1 to state 2, the path 617 may be taken. If the state machine determines to transition from state 2 to state 1, the path 618 may be taken. If the state machine determines to transition from state 0 to state 2, the path 621 may be taken. If the state machine determines to transition from state 2 to state 0, the path 622 may be taken.

In the illustrated example of FIG. 6A, state 0 602 can correspond to a non-filtering (e.g., filtering disabled) state. Referring to FIG. 6B, in some cases, an evaluation interval 660 can include a plurality of command intervals (CIs) 662. In the illustrated example, the evaluation interval 660 includes three CIs 662. As illustrated in FIG. 6B, a state 0 waveform 652 shows that filtering can be turned off during all of the three CIs 662 of the evaluation interval 660 of the state 0 602.

Although the example of FIG. 6A illustrates a concurrent cloning and flooding attack mitigation state machine 600 including three states, state machines with more (three or more) or fewer (two) states may also be used without departing from the scope of the present disclosure.

Figure 7:
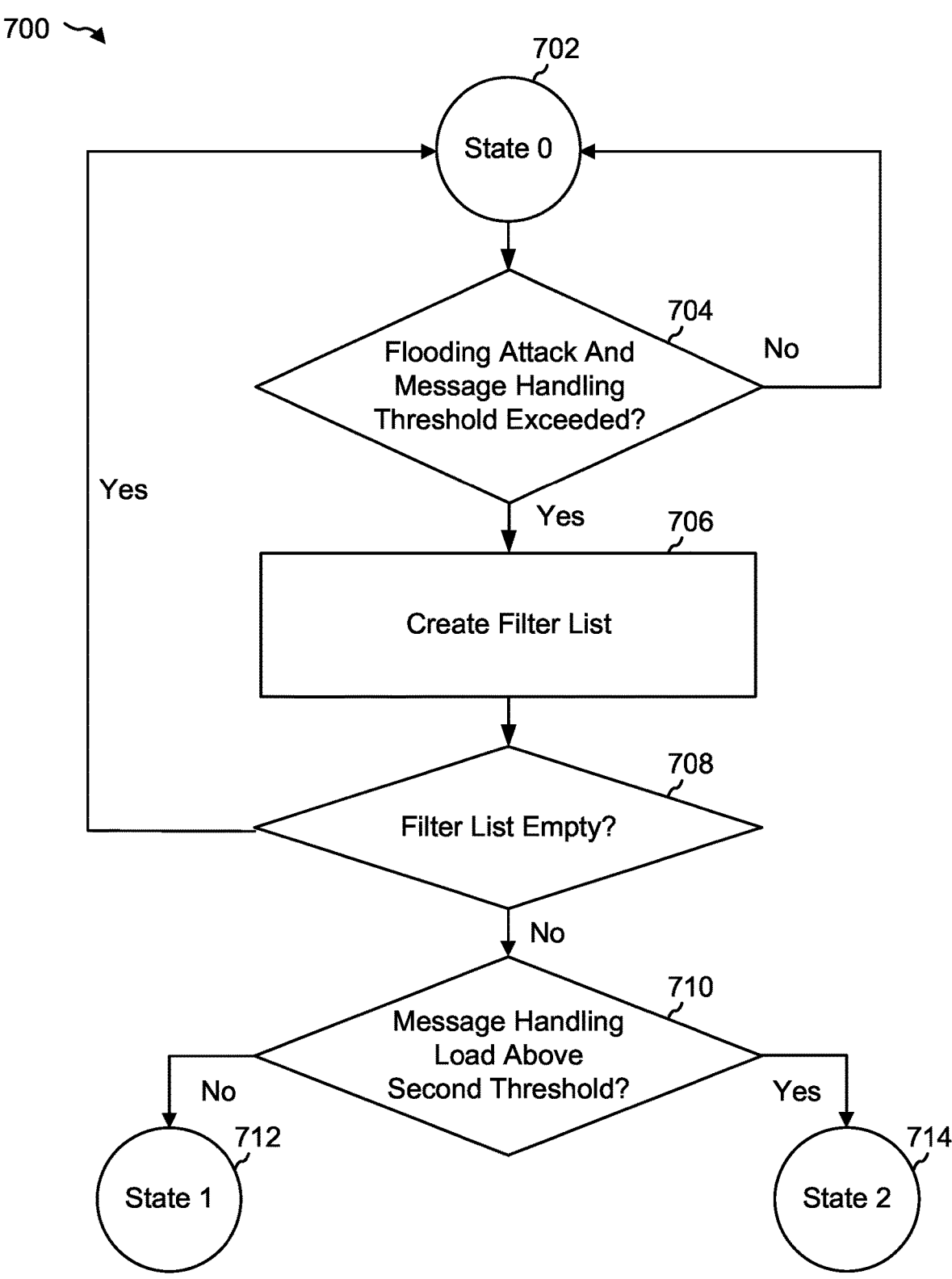
FIG. 7 is a block diagram illustrating a decision tree for transitioning between states of the of the concurrent cloning and flooding attack mitigation state machine of FIG. 6A, in accordance with some aspects of the present disclosure.

FIG. 7 is a flow diagram illustrating a process 700 for determining whether to transition out of a non-filtering state (e.g., state 0 602 of FIG. 6A) or remain in the non-filtering state for the concurrent cloning and flooding attack mitigation state machine 600 of FIG. 6A, in accordance with some aspects of the present disclosure.

At block 702, the process 700 includes operating in a non-filtering state (e.g., state 0 of FIG. 6A) during an evaluation interval. In some implementations, the process 700 can determine a minimum duration for the evaluation interval according to Equation (1) below:

$$n > \frac{T_{I2V,max}}{T_{CI}} \tag{1}$$

Where n (a positive integer) is a number of CIs (e.g., CIs 662 of FIG. 6B) to include in an evaluation interval (e.g., evaluation interval 660 of FIG. 6B), $T_{I2V,max}$ is a maximum periodicity for infrastructure to vehicle (I2V) messages (e.g., message from RSU 105 of FIG. 1 to a vehicle 110a, 110b of FIG. 1), and $T_{CI}$ is a period of the CIs during the evaluation interval (CIs 662 of FIG. 6B). In some cases, setting the minimum duration of the evaluation interval according to Equation (1) to ensure that the evaluation interval is sufficiently long to receive at least one message from a cloned UE (e.g., a cloning attack victim).

At block 704 the process 700 can determine whether a flooding attack is occurring (e.g., a flooding attack occurred during the evaluation interval of block 702). As noted above, determining that a flooding attack is occurring can include determining that a cumulative message rate for incoming messages exceeds a cumulative message rate threshold. If the process 700 determines that a flooding attack is occurring, the process 700 can determine whether a message handling load exceeds or does not exceed a message handling threshold according to Equation (2) below:

$$0 < \eta < \eta_{th1} \ \&\& \ T_j < T_{j,th1} \tag{2}$$

Where $\eta$ is an indicator of utilization of an MVM (e.g., MVM 565 of FIG. 5), $\eta_{th1}$ is a first MVM utilization threshold, $T_j$ is an operating temperature of the MVM (e.g., a junction temperature of the MVM), and $T_{j,th1}$ is a first MVM operating temperature threshold. As used herein, junction temperature refers to the temperature experienced by transistors of an electronic device during operation. In some implementations, the value of $T_j$ for comparison with one or more MVM operating temperature thresholds can be an average of the operating temperature of the MVM during the evaluation interval.

Referring to Equation (2), if the utilization $\eta$ is below the first MVM utilization threshold $\eta_{th1}$ and the operating temperature $T_j$ is below the first MVM operating temperature threshold, the process 700 can determine that a flooding attack affecting operation of the MVM. In some cases, based on a determination that a flooding attack is not occurring, the process 700 can select the non-filtering state (e.g., state 0 of FIG. 6A) as a next state for the MVM and return to block 702.

In some examples, if either the utilization $\eta$ is above the first MVM utilization threshold $\eta_{th1}$ or the operating temperature $T_j$ is above the first MVM operating temperature threshold, the process 700 can determine that a flooding attack affecting operation of the MVM, and the process 700 can select a filtering state as a potential next state for the MVM based on a message handling load as illustrated by Equation (3) and Equation (4) below:

$$(\eta_{th1} \leq \eta < \eta_{th2} \| T_{j,th1} \leq T_j < T_{j,th2}) \,\&\&\, \text{NOT}(\eta_{th2} \leq \eta \| T_{j,th2} \leq T_j) \quad (3)$$

Where $\eta_{th2}$ is a second MVM utilization threshold, and $T_{j,th2}$ is a second operating temperature threshold.

$$\eta_{th2} \leq \eta \| T_{j,th2} \leq T_j \quad (4)$$

Referring to Equation (3), if the utilization $\eta$ falls between the first utilization threshold $\eta_{th1}$ and the second utilization $\eta_{th2}$ threshold or the operating temperature $T_j$ falls between the first operating temperature threshold $T_{j,th1}$ and the second operating temperature threshold $T_{j,th2}$ and that the conditions of Equation (4) are not satisfied, the process 700 can select a first filtering state (e.g., state 1 604 of FIG. 6A) as a potential next state for the MVM.

Referring to Equation (4), if the utilization $\eta$ exceeds the second utilization threshold $\eta_{th2}$ or the operating temperature $T_j$ exceeds the second operating temperature threshold $T_{j,th2}$ the process 700 can select a second filtering state (e.g., state 2 606 of FIG. 6A) as a potential next state for the MVM.

At block 706, the process 700 can create a filter list. In some examples, source IDs can be added to the filter list based on a source-specific messaging rate exceeding for a particular source ID exceeding a source-specific messaging rate threshold. For example, the process 700 can determine, for each source ID that provided an incoming message to the MVM during the evaluation interval, whether the source-specific messaging rate for the respective source ID exceeds the source-specific messaging rate threshold. For each source ID that exceeds the source-specific messaging rate threshold, the process 700 can add the source ID the filter list.

In some cases, the process 700 can consider additional information for determining whether a source ID should be added to the filter list. For example, information contained in a database of equipped UEs (e.g., as described above with respect to Table 1) may be used to determine whether a particular source ID should not be filtered. For example, if the database includes information indicating a particular source ID belongs to a cloning victim during a concurrent cloning and flooding attack, the process 700 may determine that the source ID of the cloning victim should not be filtered to ensure that important messages (e.g., from an RSU) are not missed.

At block 708, the process 700 can determine whether the filter list is empty. For example, if no individual source ID exceeds the source-specific message rate threshold, then no source IDs may be included in the filter list despite the cumulative messaging rate exceeding the cumulative messaging rate threshold. In another illustrative example, if the only source IDs that exceed the source-specific message rate threshold are also source IDs belonging to cloning victims, the filter list may be empty. If the filter list is empty, the process 700 can select the non-filtering state (e.g., state 0 602 of FIG. 6A) as a next state and return to block 702. If the filter list is not empty, the process 700 can proceed to block 710.

At block 710, the process 700 can determine which filtering state to use as a next state. For example, if the conditions of Equation (4) are satisfied, the process can select state 2 as the next state and proceed to block 714. If the conditions of Equation (4) are not satisfied and the conditions of Equation (3) are satisfied, the process 700 can select the first filtering state (e.g., state 1 of FIG. 6A) as the next state and proceed to block 712.

Returning to FIG. 6B, a waveform 654 for state 1 and a waveform 656 for state 2 are illustrated. As shown in FIG. 6B, each CI 662 can have a filter on period and a filter off period. As used herein, duty cycle for a state refers to a numerical correspondence (e.g., a ratio) between the filter on period for a particular state and the period of the CIs 662.

Referring to waveform 654, during the first CI 662 (e.g., CI=0), filtering can be turned on from the beginning of the CI for an on period $T_{ON}$. As illustrated, after the on period $T_{ON}$, filtering can be turned off for the remainder of the CI for an off period $T_{OFF}$.

During the second CI 662 (e.g., CI=1), filtering can be turned off from the beginning of the CI for a shift period $T_{SHIFT}$. Following the shift period $T_{SHIFT}$, filtering can be turned on for the on period $T_{ON}$. After the on period $T_{ON}$, filtering can be turned off for the remainder of the CI for a period of $T_{OFF}-T_{SHIFT}$.

During the third CI 662 (e.g., CI=2), filtering can be turned off from the beginning of the CI for a second shift period equal to twice the shift period (e.g., $2^*T_{SHIFT}$). Following the second shift period $2^*T_{SHIFT}$, filtering can be turned on for the on period $T_{ON}$. After the on period $T_{ON}$, filtering can be turned off for the remainder of the CI for a period of $T_{OFF}-2^*T_{SHIFT}$.

In some cases, by applying different shifts to the filtering on period $T_{ON}$ for different CIs 662 of the evaluation interval 660, messages from a cloned UE (e.g., a victim of a cloning attack) may be more likely to be received when compared to using a static timing within every CI 662 for the filtering on period $T_{ON}$.

Referring to waveform 656, during the first CI 662 (e.g., CI=0), filtering can be turned on from the beginning of the CI for an on period $T_{ON,2}$. As illustrated, after the on period $T_{ON,2}$, filtering can be turned off for the remainder of the CI for an off period $T_{OFF,2}$.

During the second CI 662 (e.g., CI=1), filtering can be turned off from the beginning of the CI for a shift period $T_{SHIFT,2}$. Following the shift period $T_{SHIFT,2}$, filtering can be turned on for the on period $T_{ON,2}$. After the on period $T_{ON,2}$, filtering can be turned off for the remainder of the CI for a period of $T_{OFF,2}-T_{SHIFT,2}$.

During the third CI 662 (e.g., CI=2), filtering can be turned off from the beginning of the CI for a second shift period equal to twice the shift period (e.g., $2*T_{SHIFT,2}$). Following the second shift period $2*T_{SHIFT,2}$, filtering can be turned on for the on period $T_{ON,2}$. After the on period $T_{ON}$, filtering can be turned off for the remainder of the CI for a period of $T_{OFF,2}-2*T_{SHIFT,2}$.

In some cases, by applying different shifts to the filtering on period $T_{ON,2}$ for different CIs 662 of the evaluation interval 660, messages from a cloned UE (e.g., a victim of a cloning attack) may be more likely to be received when compared to using a static timing within every CI 662 with the filtering on period $T_{ON,2}$. In addition, when the message handling load is high, the second filtering state (e.g., state 2 606 of FIG. 6A) can provide a greater duty cycle of filtering on to reduce further the total load on the MVM.

Figure 8:
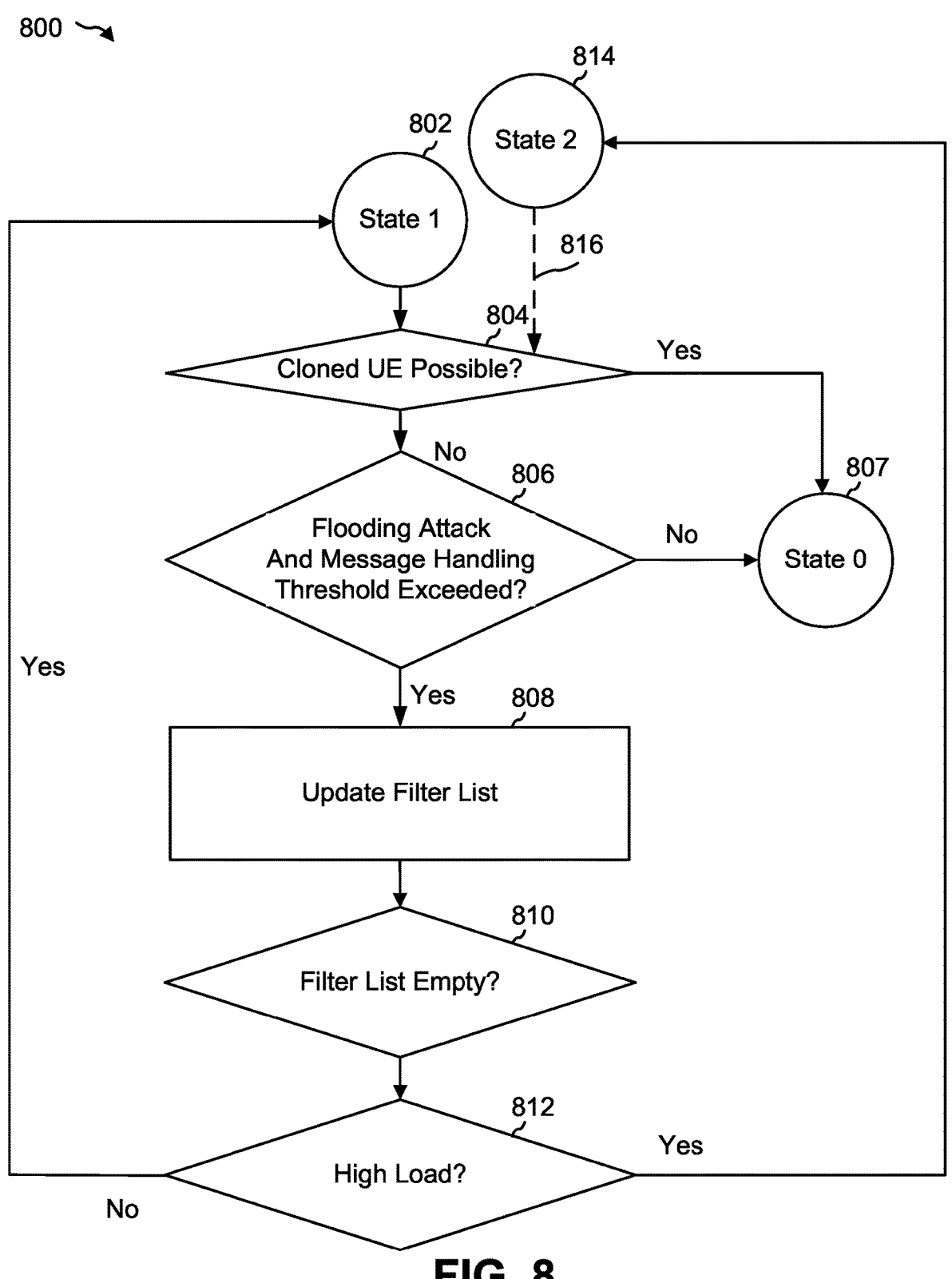
FIG. 8 is an additional block diagram illustrating a decision tree for transitioning between states of the of the concurrent cloning and flooding attack mitigation state machine of FIG. 6A, in accordance with some aspects of the present disclosure.

FIG. 8 is a flow diagram illustrating a process 800 for determining whether to transition out of a first filtering state (e.g., state 1 604 of FIG. 6A) to another filtering state (e.g., state 2 606 of FIG. 6A), to remain in the current filtering state, or to transition out of the current filtering state to a non-filtering state (e.g., state 0 of FIG. 6A) for the concurrent cloning and flooding attack mitigation state machine of FIG. 6A, in accordance with some aspects of the present disclosure.

At block 802, the process 800 includes operating in a filtering state (e.g., state 1 604 of FIG. 6A) during an evaluation interval. In some implementations, the process 800 can determine a minimum duration for the evaluation interval for the filtering state according to Equation (5) below:

$$n \leq \frac{T_{I2V,min}}{T_{CI}} \qquad (5)$$

Where n (a positive integer) is a number of CIs (e.g., CIs 662 of FIG. 6B) to include in an evaluation interval (e.g., evaluation interval 660 of FIG. 6B), $T_{I2V,min}$ is a minimum periodicity for I2V messages (e.g., message from RSU 105 of FIG. 1 to a vehicle 110a, 110b of FIG. 1), and $T_{CI}$ is a period of the CIs during the evaluation interval (CIs 662 of FIG. 6B). In some cases, setting the maximum duration of the evaluation interval according to Equation (5) can ensure that if a message from a cloned UE (e.g., a cloning attack victim) is received during a $T_{OFF}$ period, that no further messages from the cloned UE will be received during the evaluation interval.

At block 804, the process 800 can determine whether there is a possibility of encountering a cloned UE (e.g., a cloning victim). For example, the process can determine based on navigation information (e.g., GNSS), a database of equipped UEs (e.g., as described with respect to Table 1 and FIG. 5), map information, speed, heading, historical information of concurrent cloning and/or traffic information, that there is a high probability of encountering an RSU. For example, when a vehicle is approaching an intersection, the probability of encountering an RSU may be high. In some cases, the process 800 can also consider whether there are any data entries in a database of equipped UEs indicating that no RSU was observed at a particular macro-location. In some aspects, if there are data entries in the database of equipped UEs indicating past observed cloned mobile UEs (e.g., OBUs of vehicles 110a, 110b of FIG. 1), the process 800 can select the non-filtered state (e.g., state 0 602 of FIG. 6A) as a next state and move to block 807. In some cases, once a message from a cloned UE is received, the process 800 can select the non-filtered state (e.g., state 0 602 of FIG. 6A) as a next state and move to block 807.

At block 806, the process 800 can determine whether a flooding attack is occurring (e.g., occurred during the most recent evaluation interval). As noted above, determining that a flooding attack is occurring can include determining that a cumulative messaging rate for incoming messages exceeds a cumulative messaging rate threshold. If the process 800 determines that a flooding attack is occurring, the process 800 can determine whether a message handling load exceeds or does not exceed a message handling threshold according to Equation (2) above.

Referring to Equation (2), if the utilization $\eta$ is below the first MVM utilization threshold $\eta_{th1}$ and the operating temperature $T_j$ is below the first MVM operating temperature threshold, the process 800 can determine that a flooding attack is not occurring (e.g., no flooding attack occurred during the evaluation interval of block 802). In some cases, based on a determination that a flooding attack is not occurring, the process 800 can select the non-filtering state (e.g., state 0 of FIG. 6A) as a next state for the MVM and move to block 807.

In some examples, if either the utilization $\eta$ is above the first MVM utilization threshold $\eta_{th1}$ or the operating temperature $T_j$ is above the first MVM operating temperature threshold, the process 800 can determine that a flooding attack is potentially affecting the operation of the MVM and the process 800 can select a filtering state as a next state for the MVM based on a message handling load as illustrated by Equation (3) and Equation (4) above.

$$(\eta_{th1} \leq \eta < \eta_{th2} \| T_{j,th1} \leq T_j < T_{j,th2}) \, \&\& \, NOT(\eta_{th2} \leq \eta \| T_{j,th2} \leq T_j) \qquad (3)$$

Where $\eta_{th2}$ is a second MVM utilization threshold, and $T_{j,th2}$ is a second operating temperature threshold.

$$\eta_{th2} \leq \eta \| T_{j,th2} \leq T_j \qquad (4)$$

Referring to Equation (3), if the utilization 11 falls between the first utilization threshold $\eta_{th1}$ and the second utilization $\eta_{th2}$ threshold or the operating temperature $T_j$ falls between the first operating temperature threshold $T_{j,th1}$ and the second operating temperature threshold $T_{j,th2}$ and that the conditions of Equation (4) are not satisfied, the process 800 can select returning to the first filtering state (e.g., state 1 604 of FIG. 6A) as a potential next state for the MVM.

Referring to Equation (4), if the utilization $\eta$ exceeds the second utilization threshold $\eta_{th2}$ or the operating temperature $T_j$ exceeds the second operating temperature threshold $T_{j,th2}$ the process 700 can select the second filtering state (e.g., state 2 606 of FIG. 6A) as a potential next state for the MVM.

At block 808, the process 800 can update a filter list. In some examples, source IDs can be added to the filter list based on a source-specific messaging rate exceeding for a particular source ID exceeding a source-specific messaging rate threshold. For example, the process 800 can determine, for each source ID that provided an incoming message to the MVM during the evaluation interval, whether the source-specific messaging rate for the respective source ID exceeds the source-specific messaging rate threshold. For each source ID that exceeds the source-specific messaging rate threshold, the process 800 can add the source ID the filter list.

In some cases, the process 800 can consider additional information for determining whether a source ID should be added to the filter list. For example, information contained in a database of equipped UEs (e.g., as described above with respect to Table 1) may be used to determine whether a particular source ID should not be filtered. For example, if the database includes information indicating a particular source ID belongs to a cloning victim during a concurrent cloning and flooding attack, the process 800 may determine that the source ID of the cloning victim should not be filtered to ensure that important messages (e.g., from an RSU) are not missed.

At block 810, the process 800 can determine whether the filter list is empty. For example, if no individual source ID exceeds the source-specific message rate threshold, then no source IDs may be included in the filter list despite the cumulative messaging rate exceeding the cumulative messaging rate threshold. In another illustrative example, if the only source IDs that exceed the source-specific message rate threshold are also source IDs belonging to cloning victims, the filter list may be empty. If the filter list is empty, the process 800 can select moving to the non-filtering state (e.g., state 0 602 of FIG. 6A) as a next state and move to block 807. If the filter list is not empty, the process 800 can proceed to block 812.

At block 812, the process 800 can determine which filtering state to use as a next state. For example, if the conditions of Equation (4) are satisfied, the process can select state 2 as the next state and proceed to block 814. If the conditions of Equation (4) are not satisfied and the conditions of Equation (3) are satisfied, the process 800 can select returning to the first filtering state (e.g., state 1 of FIG. 6A) as the next state and return to block 802.

As illustrated by the dashed line 816 in FIG. 8, in some implementations, the process 800 can alternatively begin at block 814. At block 814, the process 800 can include operating in a second filtering state (e.g., state 2) during an evaluation interval determining whether to transition out of the second filtering state.

Returning to FIG. 5, the communications system 558 can be or can include a telematics control unit (TCU). In some implementations, the TCU can include a network access device (NAD) (also referred to in some cases as a network control unit or NCU). The NAD can include the modem 564, any other modem not shown in FIG. 5, the OEM SIM 560, the user SIM 562, and/or other components used for wireless communications. In some examples, the communications system 558 can include a Global Navigation Satellite System (GNSS). In some cases, the GNSS can be part of the one or more sensor systems 556, as described below. The GNSS can provide the ability for the vehicle computing system 550 to perform one or more location services, navigation services, and/or other services that can utilize GNSS functionality.

In some cases, the communications system 558 can further include one or more wireless interfaces (e.g., including one or more transceivers and one or more baseband processors for each wireless interface) for transmitting and receiving wireless communications, one or more wired interfaces (e.g., a serial interface such as a universal serial bus (USB) input, a lightening connector, and/or other wired interface) for performing communications over one or more hardwired connections, and/or other components that can allow the vehicle 504 to communicate with a network and/or other UEs.

The vehicle computing system 550 can also include an infotainment system 554 that can control content and one or more output devices of the vehicle 504 that can be used to output the content. The infotainment system 554 can also be referred to as an in-vehicle infotainment (IVI) system or an In-car entertainment (ICE) system. The content can include navigation content, media content (e.g., video content, music or other audio content, and/or other media content), among other content. The one or more output devices can include one or more graphical user interfaces, one or more displays, one or more speakers, one or more extended reality devices (e.g., a VR, AR, and/or MR headset), one or more haptic feedback devices (e.g., one or more devices configured to vibrate a seat, steering wheel, and/or other part of the vehicle 504), and/or other output device.

In some examples, the computing system 550 can include the intelligent transport system (ITS) 555. In some examples, the ITS 555 can be used for implementing V2X communications. For example, an ITS stack of the ITS 555 can generate V2X messages based on information from an application layer of the ITS. In some cases, the application layer can determine whether certain conditions have been met for generating messages for use by the ITS 555 and/or for generating messages that are to be sent to other vehicles (for V2V communications), to pedestrian UEs (for V2P communications), and/or to infrastructure systems (for V2I communications). In some cases, the communications system 558 and/or the ITS 555 can obtain car access network (CAN) information (e.g., from other components of the vehicle via a CAN bus). In some examples, the communications system 558 (e.g., a TCU NAD) can obtain the CAN information via the CAN bus and can send the CAN information to a PHY/MAC layer of the ITS 555. The ITS 555 can provide the CAN information to the ITS stack of the ITS 555. The CAN information can include vehicle related information, such as a heading of the vehicle, speed of the vehicle, breaking information, among other information. The CAN information can be continuously or periodically (e.g., every 1 millisecond (ms), every 10 ms, or the like) provided to the ITS 555.

The conditions used to determine whether to generate messages can be determined using the CAN information based on safety-related applications and/or other applications, including applications related to road safety, traffic efficiency, infotainment, business, and/or other applications. In one illustrative example, the ITS 555 can perform lane change assistance or negotiation. For instance, using the CAN information, the ITS 555 can determine that a driver of the vehicle 504 is attempting to change lanes from a current lane to an adjacent lane (e.g., based on a blinker being activated, based on the user veering or steering into an adjacent lane, etc.). Based on determining the vehicle 504 is attempting to change lanes, the ITS 555 can determine a lane-change condition has been met that is associated with a message to be sent to other vehicles that are nearby the vehicle in the adjacent lane. The ITS 555 can trigger the ITS stack to generate one or more messages for transmission to the other vehicles, which can be used to negotiate a lane change with the other vehicles. Other examples of applications include forward collision warning, automatic emergency breaking, lane departure warning, pedestrian avoidance or protection (e.g., when a pedestrian is detected near the vehicle 504, such as based on V2P communications with a UE of the user), traffic sign recognition, among others.

The ITS 555 can use any suitable protocol to generate messages (e.g., V2X messages). Examples of protocols that can be used by the ITS 555 include one or more Society of Automotive Engineering (SAE) standards, such as SAE J2735, SAE J2945, SAE J3161, and/or other standards, which are hereby incorporated by reference in their entirety and for all purposes.

A security layer of the ITS 555 can be used to securely sign messages from the ITS stack that are sent to and verified by other UEs configured for V2X communications, such as other vehicles, pedestrian UEs, and/or infrastructure systems. The security layer can also verify messages received from such other UEs. In some implementations, the signing and verification processes can be based on a security context of the vehicle. In some examples, the security context may include one or more encryption-decryption algorithms, a public and/or private key used to generate a signature using an encryption-decryption algorithm, and/or other information. For example, each ITS message generated by the ITS 555 can be signed by the security layer of the ITS 555. The signature can be derived using a public key and an encryption-decryption algorithm. A vehicle, pedestrian UE, and/or infrastructure system receiving a signed message can verify the signature to make sure the message is from an authorized vehicle. In some examples, the one or more encryption-decryption algorithms can include one or more symmetric encryption algorithms (e.g., advanced encryption standard (AES), data encryption standard (DES), and/or other symmetric encryption algorithm), one or more asymmetric encryption algorithms using public and private keys (e.g., Rivest-Shamir-Adleman (RSA) and/or other asymmetric encryption algorithm), and/or other encryption-decryption algorithm.

In some examples, the ITS 555 can determine certain operations (e.g., V2X-based operations) to perform based on messages received from other UEs. The operations can include safety-related and/or other operations, such as operations for road safety, traffic efficiency, infotainment, business, and/or other applications. In some examples, the operations can include causing the vehicle (e.g., the control system 552) to perform automatic functions, such as automatic breaking, automatic steering (e.g., to maintain a heading in a particular lane), automatic lane change negotiation with other vehicles, among other automatic functions. In one illustrative example, a message can be received by the communications system 558 from another vehicle (e.g., over a PC5 interface, a DSRC interface, or other device to device direct interface) indicating that the other vehicle is coming to a sudden stop. In response to receiving the message, the ITS stack can generate a message or instruction and can send the message or instruction to the control system 552, which can cause the control system 552 to automatically break the vehicle 504 so that it comes to a stop before making impact with the other vehicle. In other illustrative examples, the operations can include triggering display of a message alerting a driver that another vehicle is in the lane next to the vehicle, a message alerting the driver to stop the vehicle, a message alerting the driver that a pedestrian is in an upcoming cross-walk, a message alerting the driver that a toll booth is within a certain distance (e.g., within 1 mile) of the vehicle, among others.

In some examples, the ITS 555 can receive a large number of messages from the other UEs (e.g., vehicles, RSUs, etc.), in which case the ITS 555 will authenticate (e.g., decode and decrypt) each of the messages and/or determine which operations to perform. Such a large number of messages can lead to a large computational load for the vehicle computing system 550. In some cases, the large computational load can cause a temperature of the computing system 550 to increase. Rising temperatures of the components of the computing system 550 can adversely affect the ability of the computing system 550 to process the large number of incoming messages. One or more functionalities can be transitioned from the vehicle 504 to another device (e.g., a user device, a RSU, etc.) based on a temperature of the vehicle computing system 550 (or component thereof) exceeding or approaching one or more thermal levels. Transitioning the one or more functionalities can reduce the computational load on the vehicle 504, helping to reduce the temperature of the components. A thermal load balancer can be provided that enable the vehicle computing system 550 to perform thermal based load balancing to control a processing load depending on the temperature of the computing system 550 and processing capacity of the vehicle computing system 550.

The computing system 550 further includes one or more sensor systems 556 (e.g., a first sensor system through an Nth sensor system, where N is a value equal to or greater than 0). When including multiple sensor systems, the sensor system(s) 556 can include different types of sensor systems that can be arranged on or in different parts the vehicle 504. The sensor system(s) 556 can include one or more camera sensor systems, LIDAR sensor systems, radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems (e.g., one or more Global Positioning System (GPS) receiver systems), accelerometers, gyroscopes, inertial measurement units (IMUs), infrared sensor systems, laser rangefinder systems, ultrasonic sensor systems, infrasonic sensor systems, microphones, any combination thereof, and/or other sensor systems. It should be understood that any number of sensors or sensor systems can be included as part of the computing system 550 of the vehicle 504.

In some implementations, the vehicle computing system 550 can also include (e.g., as part of or separate from the control system 552, the infotainment system 554, the communications system 558, and/or the sensor system(s) 556) at least one processor 566 and at least one memory 568 having computer-executable instructions that are executed by the at least one processor. The at least one processor is in communication with and/or electrically connected to (referred to as being "coupled to" or "communicatively coupled to") the at least one memory. The at least one processor 566 can include, for example, one or more microcontrollers, one or more central processing units (CPUs), one or more field programmable gate arrays (FPGAs), one or more graphics processing units (GPUs), one or more application processors (e.g., for running or executing one or more software applications), and/or other processors. The at least one memory can include, for example, read-only memory (ROM), random access memory (RAM) (e.g., static RAM (SRAM)), electrically erasable programmable read-only memory (EEPROM), flash memory, one or more buffers, one or more databases, and/or other memory. The computer-executable instructions stored in or on the at least memory can be executed to perform one or more of the functions or operations described herein. In some cases, the at least one processor 566 can be configured to perform one or more operations associated with wireless communications, which can include mitigating concurrent cloning and flooding attacks. In some examples, the vehicle computing system

550, the control system 552 the communications system 558, the at least one processor 566, and/or any combination thereof can be configured to perform one or more operations associated with mitigation of concurrent cloning and flooding attacks.

While the vehicle computing system 550 is shown to include certain components and/or systems, one of ordinary skill will appreciate that the vehicle computing system 550 can include more or fewer components than those shown in FIG. 5. For example, the vehicle computing system 550 can also include one or more input devices and one or more output devices (not shown).

Figure 9:
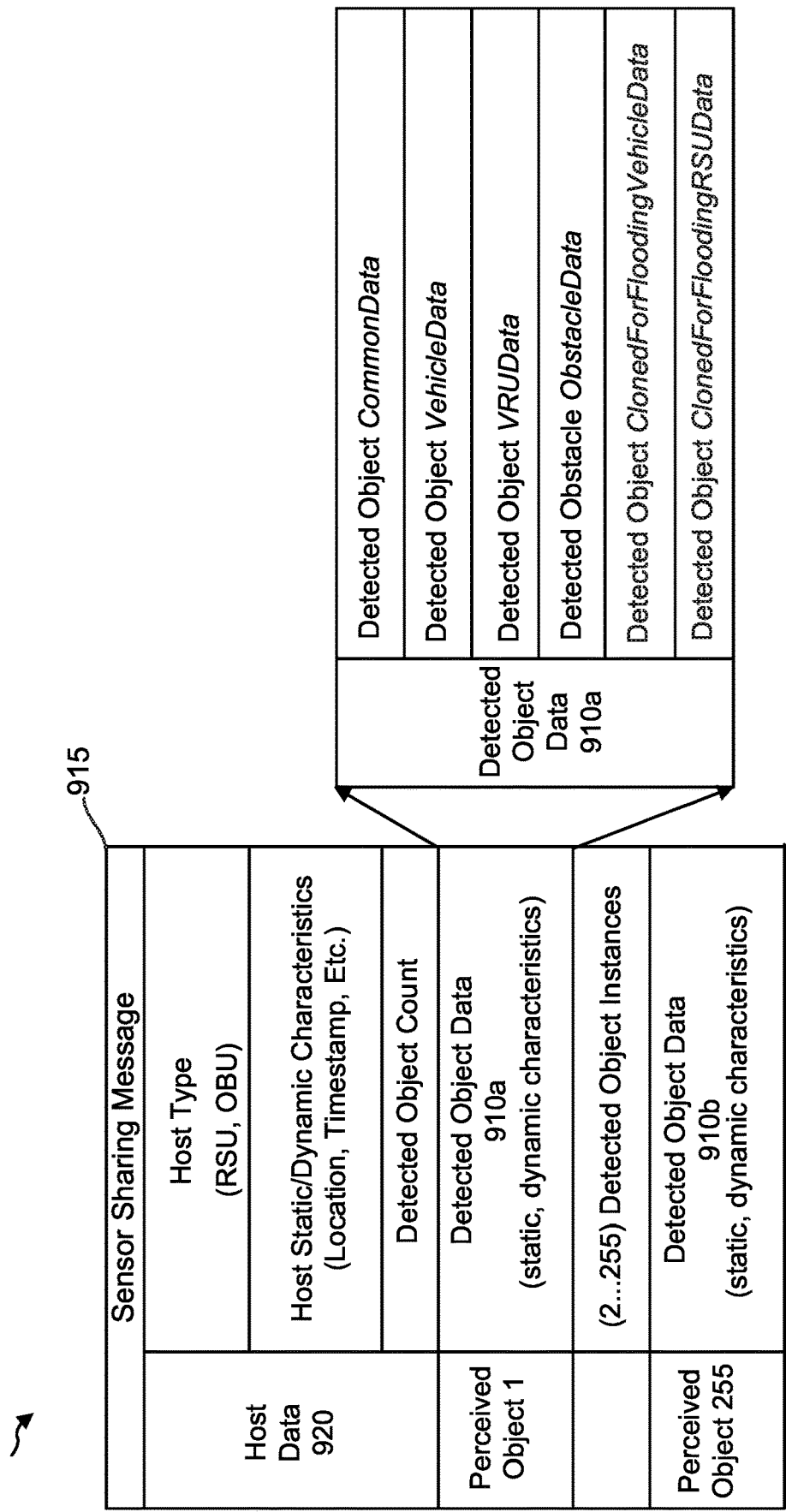
FIG. 9 is a diagram illustrating an example of a vehicle-based message (shown as a sensor-sharing message), in accordance with some aspects of the present disclosure.

FIG. 9 is a diagram 900 illustrating an example of a vehicle-based message (e.g., vehicle-based message 915). The vehicle-based message 915 is shown as a sensor-sharing message (e.g., an SDSM), but can include a BSM, a CAM, a CPM, or other vehicle-based message as noted herein. In FIG. 9, the vehicle-based message 915 is shown to include HostData 920 and Detected Object Data 910*a*, 910*b*. The HostData 920 of the vehicle-based message 915 may include information related to the transmitting device (e.g., the transmitting equipped network entity, such as RSU 105 of FIG. 1 or an OBU of a vehicle, such as on vehicles 110*a*, 110*b* of FIG. 1) of the vehicle-based message 915. For example, the HostData 920 may include host type (e.g., RSU, OBU of a vehicle), host characteristics (e.g., static or dynamic characteristics related to the detected vehicle or object, and/or other information related to the detected vehicle or object), and a detected object count. The Detected Object Data 910*a*, 910*b* of the vehicle-based message 915 may include information related to the detected vehicle or object. The Detected Object Data 910*a*, 910*b* may specifically include Detected Object CommonData, Detected Object VehicleData, Detected Object VRUData, Detected Obstacle ObstacleData, Detected Object ClonedForFloodingVehicleData, and Detected Object ClonedForFloodingR-SUData.

In some cases, Detected Object ClonedForFloodingVehicleData, and Detected Object ClonedForFloodingRSUData can be used to keep track of vehicles and/or RSUs (and corresponding source IDs) that have been cloned for the purposes of performing a concurrent cloning and flooding attack.

These vehicle-based messages 915 are beneficial because they can provide an awareness and understanding to the equipped network devices (e.g., vehicles 110*a*, 110*b*, attacker 115 of FIG. 1) of upcoming potential road dangers (e.g., unforeseen oncoming vehicles, accidents, and road conditions).

FIG. 10 is a flow diagram illustrating an example of a process 1000 of wireless communication. The process 1000 and/or other process described herein can be performed by a computing device (or apparatus) or a component (e.g., a chipset, codec, etc.) of the computing device. The computing device may be an extended reality (XR) device (e.g., a virtual reality (VR) device or augmented reality (AR) device), a mobile device (e.g., a mobile phone), a network-connected wearable such as a watch, a vehicle or component or system of a vehicle, or other type of computing device. In one example, the process 1000 and/or other process described herein can be performed by the vehicle computing system 550 of FIG. 5. In another example, one or more of the processes can be performed by the computing system 1100 shown in FIG. 11. For instance, a computing device with the computing system 1100 shown in FIG. 11 can include the components of the vehicle computing system 550 and can implement the operations of the process 1000 of FIG. 10 and/or other process described herein. The operations of the process 1000 may be implemented as software components that are executed and run on one or more processors (e.g., the processor 1110 of FIG. 11, a processor such as a DSP, GPU, NPU, etc., or other processor(s)). Further, the transmission and reception of signals by the computing device in the process 1000 may be enabled, for example, by one or more antennas, one or more transceivers (e.g., wireless transceiver(s)), and/or other communication components of the computing device (e.g., the communications interface 1140 of FIG. 11).

At block 1002, the computing device (or component thereof) can obtain a wireless communication message associated with a source identifier (ID) (e.g., a source ID of a UE, RSU, or an attacker).

At block 1004, the computing device (or component thereof) can determine that the source ID is associated with a flooding attack. In some aspects, determining that a flooding attack is occurring includes determining that a cumulative messaging rate of a plurality of wireless communication messages including the wireless communication message exceeds a cumulative message rate threshold.

At block 1006, the computing device (or component thereof) can filter, based on determining that the source ID is associated with a flooding attack, wireless communication messages associated with the source ID. In some aspects, filtering the wireless communication messages includes alternating between a first filtering state (e.g., state 0 602, state 1 604, state 2 606 of FIG. 6A and FIG. 6B) and a second filtering state (e.g., state 0 602, state 1 604, state 2 606 of FIG. 6A and FIG. 6B). In some cases, the first filtering state and the second filtering state are associated with different amounts of filtering. In some examples, the computing device (or component thereof) can generate, based on determining that a source-specific message rate associated with the source ID exceeds a source-specific message rate threshold, a filtering list including the source ID.

In some aspects, the computing device (or component thereof) can transition, based on determining that a message load indicator associated with the flooding attack exceeds a message load threshold (e.g., a utilization threshold, an operating temperature threshold), from a first filtering state to a second filtering state. In some cases, transitioning, based on determining that the message load indicator associated with the flooding attack exceeds the message load threshold, includes changing operation of a message handling component from a first filtering state to a second filtering state. In some cases, determining that the message load indicator associated with the flooding attack exceeds the message load threshold includes determining that at least one of a utilization of a message handling module exceeds a utilization threshold or an operating temperature of the message handling module exceeds an operating temperature threshold. In some aspects, the operating temperature of the message handling module includes a junction temperature of the message handling module. In some cases, the operating temperature threshold includes a predetermined junction temperature. In some examples, the utilization of the message handling module includes a numerical correspondence between a verification rate of the message handling module and a verification capacity of the message handling module.

In some cases, the message load threshold is associated with the second filtering state. In some examples, the message load threshold is greater than an additional message load threshold associated with the first filtering state. In some cases, the first filtering state is associated with filtering being disabled (e.g., state 0 of FIG. 6A and FIG. 6B). In some cases, the second filtering state is associated with filtering being enabled (e.g., state 1, state 2 of FIG. 6A and FIG. 6B). In some implementations, the first filtering state is associated with filtering with a first duty cycle (e.g., state 1 of FIG. 6A and FIG. 6B) and the second filtering state is associated with filtering with a second duty cycle, the second duty cycle being greater than the first duty cycle (e.g., state 2 of FIG. 6A and FIG. 6B).

In some implementations, the utilization of the message handling module is evaluated during listening to messages from the source ID (e.g., during $T_{OFF,1}$, $T_{OFF,2}$, $T_{SHIFT,1}$, and/or the utilization of the message handling module to a total duration of listening to messages from the source ID during an evaluation interval (e.g., evaluation interval 660 of FIG. 6B).

In some implementations, determining that the message load indicator associated with the flooding attack originating from one or more flooding source IDs of one or more flooding UEs exceeds the message load threshold includes evaluating the message load indicator over an evaluation interval. In some cases, the evaluation interval includes a plurality of command intervals. In some aspects, alternating between intervals of ignoring messages from the one or more flooding source IDs and intervals of listening to messages from the one or more flooding source IDs includes applying different timing offsets to the intervals of ignoring messages from the one or more flooding source IDs within individual command intervals of the evaluation interval. In some examples, applying different timing offsets to the intervals of listening to messages from the one or more flooding source IDs within individual command intervals of the evaluation interval includes listening to messages from the one or more flooding source IDs during different portions of individual command intervals. In some implementations, applying different timing offsets to the intervals of ignoring messages from the one or more flooding source IDs within individual command intervals of the evaluation interval includes cumulatively listening to messages during every timing offset associated with command intervals of the evaluation interval.

In some cases, the first filtering state includes enabling filtering for a first portion of the first filtering state, disabling filtering for a second portion of the first filtering state, and enabling filtering for a third portion of the first filtering state. In some implementations, the second portion of the first filtering state occurs between the first portion of the first filtering state and the third portion of the first filtering state.

In some examples, the computing device (or component thereof) can, prior to determining that the message load indicator associated with the flooding attack exceeds the message load threshold, determine based on determining that a cumulative messaging rate of a plurality of wireless communication messages comprising the wireless communication message exceeds a cumulative message rate threshold, that the flooding attack is occurring.

In some aspects, the computing device (or component thereof) can determine, during intervals of listening to messages from the source ID, that the source ID includes a cloned source ID. In some examples, the computing device (or component thereof) can, based on determining that the source ID includes a cloned source ID, remove the source ID from a filtering list. In some implementations, determining that the source ID includes a cloned source ID includes identifying that the cloned source ID is associated with a UE based on one or more of historical data, location information, speed, heading, a local database, or crowdsourced information.

In some examples, the processes described herein (e.g., process 1000 and/or any other process described herein) may be performed by a computing device or apparatus (e.g., a vehicle computing system 550 of FIG. 5). In another example, the process 1000 may be performed by a computing device with the computing system 1100 shown in FIG. 1100

Figure 11:
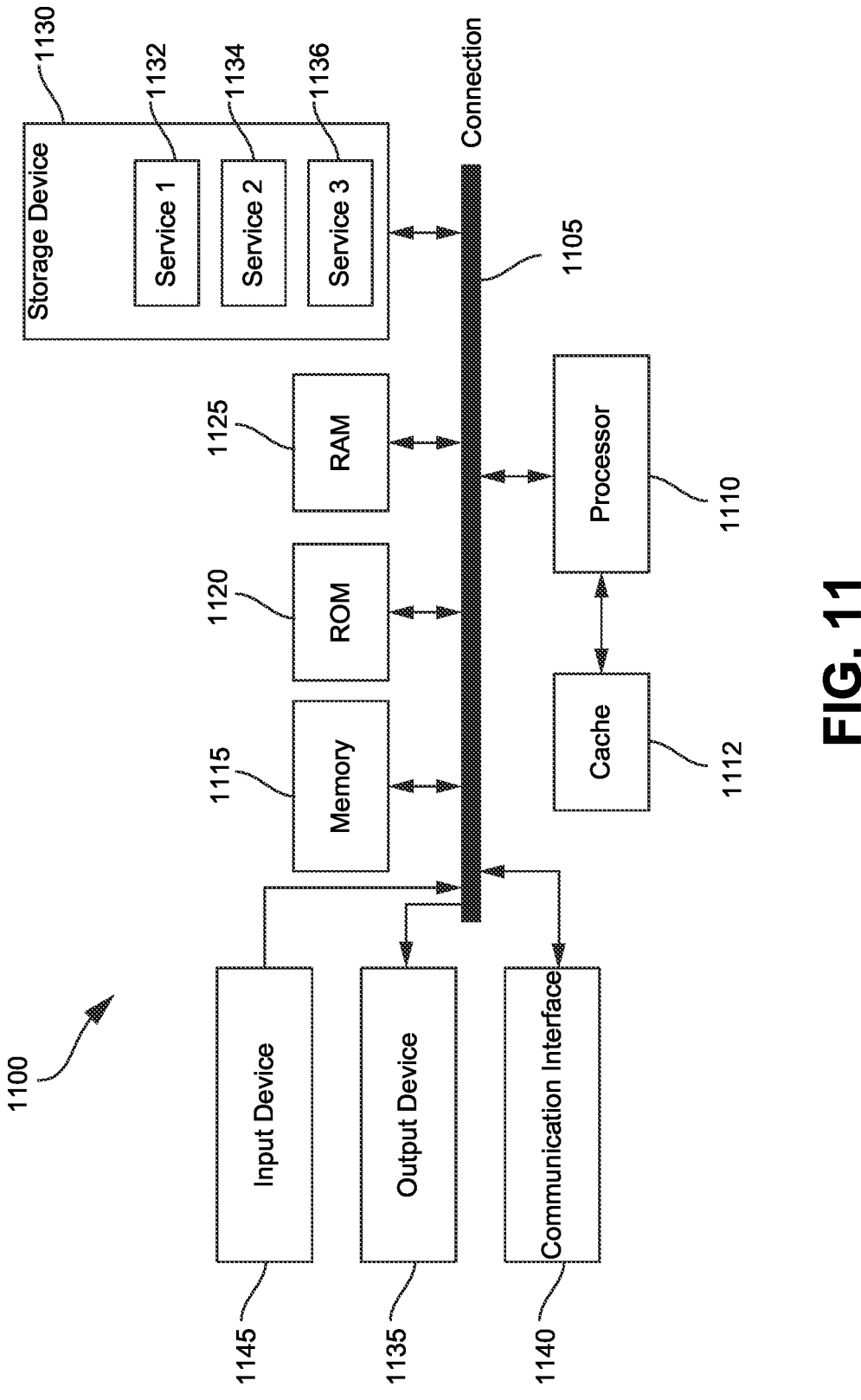
FIG. 11 illustrates an example computing system, according to aspects of the disclosure.

FIG. 11 is a block diagram illustrating an example of a computing system 1100, which may be employed by the disclosed system for smart vehicle malfunction and driver misbehavior detection and alert, in accordance with some aspects of the present disclosure. In particular, FIG. 11 illustrates an example of computing system 1100, which can be for example any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some aspects, computing system 1100 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example computing system 1100 includes at least one processing unit (CPU or processor) 1110 and connection 1105 that communicatively couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100.

Computing system 1100 can include communications interface 1140, which can generally govern and manage the user input and system output. The communication interface may perform or facilitate receipt and/or transmission wired or wireless communications using wired and/or wireless transceivers, including those making use of an audio jack/ plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1140 may also include one or more range sensors (e.g., LIDAR sensors, laser range finders, RF radars, ultrasonic sensors, and infrared (IR) sensors) configured to collect data and provide measurements to processor 1110, whereby processor 1110 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based GPS, the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some aspects, a hardware service that performs a particular function can include the software component stored in a computer-readable medium in connection with the necessary hardware components, such as processor 1110, connection 1105, output device 1135, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects, the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, micro-controller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. A method of wireless communication, the method comprising: obtaining a wireless communication message associated with a source identifier (ID); determining that the source ID is associated with a flooding attack; and filtering, based on determining that the source ID is associated with a flooding attack, wireless communication messages associated with the source ID, wherein filtering the wireless communication messages comprises alternating between a first filtering state and a second filtering state, wherein the first filtering state and the second filtering state are associated with different amounts of filtering.

Aspect 2. The method of Aspect 1, further comprising transitioning, based on determining that a message load indicator associated with the flooding attack exceeds a message load threshold, from a first filtering state to a second filtering state.

Aspect 3. The method of any of Aspect 2, wherein transitioning, based on determining that the message load indicator associated with the flooding attack exceeds the message load threshold, comprises changing operation of a message handling component from a first filtering state to a second filtering state.

Aspect 4. The method of Aspect 2 or 3, wherein the message load threshold is associated with the second filtering state, and wherein the message load threshold is greater than an additional message load threshold associated with the first filtering state.

Aspect 5. The method of any of Aspects 2 to 4, wherein the first filtering state is associated with filtering being disabled, and wherein the second filtering state is associated with filtering being enabled.

Aspect 6. The method of any of Aspects 2 to 5, wherein the first filtering state is associated with filtering with a first duty cycle and the second filtering state is associated with filtering with a second duty cycle, the second duty cycle being greater than the first duty cycle.

Aspect 7. The method of any of Aspects 2 to 6, wherein determining that the message load indicator associated with the flooding attack exceeds the message load threshold comprises determining that at least one of a utilization of a message handling module exceeds a utilization threshold or an operating temperature of the message handling module exceeds an operating temperature threshold.

Aspect 8. The method of Aspect 7, wherein the operating temperature of the message handling module comprises a junction temperature of the message handling module, and wherein the operating temperature threshold comprises a predetermined junction temperature.

Aspect 9. The method of any of Aspects 7 to 8, wherein the utilization of the message handling module comprises a numerical correspondence between a verification rate of the message handling module and a verification capacity of the message handling module.

Aspect 10. The method of any of Aspects 7 to 9, wherein the utilization of the message handling module is evaluated during listening to messages from the source ID.

Aspect 11. The method of any of Aspects 7 to 10, further comprising normalizing the utilization of the message handling module to a total duration of listening to messages from the source ID during an evaluation interval.

Aspect 12. The method of any of Aspects 7 to 11, further comprising, prior to determining that the message load indicator associated with the flooding attack exceeds the message load threshold, determining, based on determining that a cumulative messaging rate of a plurality of wireless communication messages comprising the wireless communication message exceeds a cumulative message rate threshold, that the flooding attack is occurring.

Aspect 13. The method of any of Aspects 2 to 12, further comprising generating, based on determining that a source-specific message rate associated with the source ID exceeds a source-specific message rate threshold, a filtering list comprising the source ID.

Aspect 14. The method of any of Aspects 2 to 13, wherein determining that the message load indicator associated with the flooding attack originating from one or more flooding source IDs of one or more flooding UEs exceeds the message load threshold comprises evaluating the message load indicator over an evaluation interval.

Aspect 15. The method of Aspect 14, wherein the evaluation interval comprises a plurality of command intervals.

Aspect 16. The method of Aspect 15, wherein alternating between intervals of ignoring messages from the one or more flooding source IDs and intervals of listening to messages from the one or more flooding source IDs comprises applying different timing offsets to the intervals of ignoring messages from the one or more flooding source IDs within individual command intervals of the evaluation interval.

Aspect 17. The method of Aspect 16, wherein applying different timing offsets to the intervals of listening to messages from the one or more flooding source IDs within individual command intervals of the evaluation interval comprises listening to messages from the one or more flooding source IDs during different portions of individual command intervals.

Aspect 18. The method of Aspect 17, wherein applying different timing offsets to the intervals of ignoring messages from the one or more flooding source IDs within individual command intervals of the evaluation interval comprises cumulatively listening to messages during every timing offset associated with command intervals of the evaluation interval.

Aspect 19. The method of any of Aspects 1 to 18, wherein the first filtering state comprises enabling filtering for a first portion of the first filtering state, disabling filtering for a second portion of the first filtering state, and enabling filtering for a third portion of the first filtering state, wherein the second portion of the first filtering state occurs between the first portion of the first filtering state and the third portion of the first filtering state.

Aspect 20. The method of any of Aspects 1 to 19, further comprising determining, during intervals of listening to messages from the source ID, that the source ID comprises a cloned source ID.

Aspect 21. The method of Aspect 20, further comprising, based on determining that the source ID comprises a cloned source ID, removing the source ID from a filtering list.

Aspect 22. The method of Aspect 20, wherein determining that he source ID comprises a cloned source ID comprises identifying that the cloned source ID is associated with a UE based on one or more of historical data, location information, speed, heading, a local database, or crowdsourced information.

Aspect 23. A method of wireless communication, the method comprising: obtaining a wireless communication message associated with a source ID; determining that a message load indicator is indicative of a filtering state transition, wherein the message load indicator is associated with the wireless communication message; and transitioning, based on determining that the message load indicator is indicative of the filtering state transition, from a first filtering state to a second filtering state, wherein the first filtering state and the second filtering state are associated with different amounts of filtering.

Aspect 24. The method of Aspect 23, wherein the first filtering state is associated with a first filtering duty cycle and the second filtering state is associated with a second filtering duty cycle, the second filtering duty cycle being greater the first filtering duty cycle.

Aspect 25. The method of Aspect 24, wherein the first filtering duty cycle comprises disabling filtering of wireless communication messages during the first filtering state and wherein the second filtering duty cycle comprises alternating between filtering the source ID and disabling filtering.

Aspect 26. The method of any of Aspects 24 to 25, wherein the second filtering duty cycle comprises disabling filtering of wireless communication messages during the second filtering state and wherein the first filtering state comprises alternating between filtering the source ID and disabling filtering.

Aspect 27. The method of any of Aspects 24 to 26, wherein: the first filtering duty cycle comprises alternating between filtering one or more flooding source IDs of one or more flooding UEs and disabling filtering with a first duty cycle; and the second filtering duty cycle comprises alternating between filtering one or more flooding source IDs of one or more flooding UEs and disabling filtering with a second duty cycle.

Aspect 28. An apparatus for wireless communication comprising: a memory; and one or more processors coupled to the memory and configured to: obtain a wireless communication message associated with a source identifier (ID); determine that the source ID is associated with a flooding attack; and filter, based on determining that the source ID is associated with a flooding attack, wireless communication messages associated with the source ID, wherein filtering the wireless communication messages comprises alternating between a first filtering state and a second filtering state, wherein the first filtering state and the second filtering state are associated with different amounts of filtering.

Aspect 29. The apparatus of Aspect 27, the one or more processors further configured to: transition, based on determining that a message load indicator associated with the flooding attack exceeds a message load threshold, from a first filtering state to a second filtering state.

Aspect 30. The apparatus of Aspect 29, wherein to transition, based on determining that the message load indicator associated with the flooding attack exceeds the message load threshold, the one or more processors are configured to change operation of a message handling component from a first filtering state to a second filtering state.

Aspect 31. The apparatus of any of Aspects 29 to 30, wherein the first filtering state is associated with filtering being disabled, and wherein the second filtering state is associated with filtering being enabled.

Aspect 32. The apparatus of any of Aspects 29 to 31, wherein the first filtering state is associated with filtering with a first duty cycle and the second filtering state is associated with filtering with a second duty cycle, the second duty cycle being greater than the first duty cycle.

Aspect 33. The apparatus of any of Aspects 29 to 32, wherein the message load threshold is associated with the second filtering state, and wherein the message load threshold is greater than an additional message load threshold associated with the first filtering state.

Aspect 34. The apparatus of any of Aspects 29 to 33, the one or more processors further configured to, prior to determining that the message load indicator associated with the flooding attack exceeds the message load threshold, determine, based on determining that a cumulative messaging rate of a plurality of wireless communication messages comprising the wireless communication message exceeds a cumulative message rate threshold, that the flooding attack is occurring.

Aspect 35. The apparatus of any of Aspects 29 to 34, the one or more processors further configured to generate, based on determining that a source-specific message rate associated with the source ID exceeds a source-specific message rate threshold, a filtering list comprising the source ID.

Aspect 36. The apparatus of any of Aspects 29 to 35, wherein determining that the message load indicator associated with the flooding attack originating from one or more flooding source IDs of one or more flooding UEs exceeds the message load threshold comprises evaluating the message load indicator over an evaluation interval.

Aspect 37. The apparatus of Aspect 36, wherein the evaluation interval comprises a plurality of command intervals.

Aspect 38. The apparatus of Aspect 37, wherein alternating between intervals of ignoring messages from the one or more flooding source IDs and intervals of listening to messages from the one or more flooding source IDs comprises applying different timing offsets to the intervals of ignoring messages from the one or more flooding source IDs within individual command intervals of the evaluation interval.

Aspect 39. The apparatus of Aspect 38, wherein applying different timing offsets to the intervals of listening to messages from the one or more flooding source IDs within individual command intervals of the evaluation interval comprises listening to messages from the one or more flooding source IDs during different portions of individual command intervals.

Aspect 40. The apparatus of Aspect 39, wherein applying different timing offsets to the intervals of ignoring messages from the one or more flooding source IDs within individual command intervals of the evaluation interval comprises cumulatively listening to messages during every timing offset associated with command intervals of the evaluation interval.

Aspect 41. The apparatus of any of Aspects 28 to 40, wherein the first filtering state comprises enabling filtering for a first portion of the first filtering state, disabling filtering for a second portion of the first filtering state, and enabling filtering for a third portion of the first filtering state, wherein the second portion of the first filtering state occurs between the first portion of the first filtering state and the third portion of the first filtering state.

Aspect 42. The apparatus of any of Aspects 28 to 41, wherein the one or more processors are further configured to determine that at least one of a utilization of a message handling module exceeds a utilization threshold or an operating temperature of the message handling module exceeds an operating temperature threshold.

Aspect 43. The apparatus of Aspect 42, wherein the operating temperature of the message handling module comprises a junction temperature of the message handling module, and wherein the operating temperature threshold comprises a predetermined junction temperature.

Aspect 44. The apparatus of Aspect 42, wherein the utilization of the message handling module comprises a numerical correspondence between a verification rate of the message handling module and a verification capacity of the message handling module.

Aspect 45. The apparatus of Aspect 42, wherein the utilization of the message handling module is evaluated during listening to messages from the source ID.

Aspect 46. The apparatus of Aspect 42, the one or more processors further configured to normalize the utilization of the message handling module to a total duration of listening to messages from the source ID during an evaluation interval.

Aspect 47. The apparatus of any of Aspects 28 to 46, the one or more processors further configured to determine, during intervals of listening to messages from the source ID, that the source ID comprises a cloned source ID.

Aspect 48. The apparatus of Aspect 47, the one or more processors further configured to, based on determining that the source ID comprises a cloned source ID, remove the source ID from a filtering list.

Aspect 49. The apparatus of any of Aspects 1 to 20, wherein determining that he source ID comprises a cloned source ID comprises identifying that the cloned source ID is associated with a UE based on one or more of historical data, location information, speed, heading, a local database, or crowdsourced information.

Aspect 50. An apparatus for wireless communication comprising: a memory; and one or more processors coupled to the memory and configured to: obtain a wireless communication message associated with a source ID; determine that a message load indicator is indicative of a filtering state transition, wherein the message load indicator is associated with the wireless communication message; and transitioning, based on determining that the message load indicator is indicative of the filtering state transition, from a first filtering state to a second filtering state, wherein the first filtering state and the second filtering state are associated with different amounts of filtering.

Aspect 51. The apparatus of Aspect 50, wherein the first filtering state is associated with a first filtering duty cycle and the second filtering state is associated with a second filtering duty cycle, the second filtering duty cycle being greater the first filtering duty cycle.

Aspect 52. The apparatus of Aspect 51, wherein the first filtering duty cycle comprises disabling filtering of wireless communication messages during the first filtering state and wherein the second filtering duty cycle comprises alternating between filtering the source ID of one or more flooding UEs and disabling filtering.

Aspect 53. The apparatus of Aspect 51, wherein the second filtering duty cycle comprises disabling filtering of wireless communication messages during the second filtering state and wherein the first filtering state comprises alternating between filtering the source ID and disabling filtering.

Aspect 54. The apparatus of Aspect 51, wherein: the first filtering duty cycle comprises alternating between filtering one or more flooding source IDs of one or more flooding UEs and disabling filtering with a first duty cycle; and the second filtering duty cycle comprises alternating between filtering one or more flooding source IDs of one or more flooding UEs and disabling filtering with a second duty cycle.

What is claimed is:

1. A method of wireless communication, the method comprising:

obtaining a wireless communication message associated with a source identifier (ID);

determining that the source ID is associated with a flooding attack; and filtering, based on determining that the source ID is associated with a flooding attack, wireless communication messages associated with the source ID, wherein filtering the wireless communication messages comprises alternating between a first filtering state and a second filtering state, wherein the first filtering state and the second filtering state are associated with different amounts of filtering, wherein the first filtering state comprises enabling filtering for a first portion of the first filtering state, disabling filtering for a second portion of the first filtering state, and enabling filtering for a third portion of the first filtering state, wherein the second portion of the first filtering state occurs between the first portion of the first filtering state and the third portion of the first filtering state.

2. The method of claim 1, further comprising:

transitioning, based on determining that a message load indicator associated with the flooding attack exceeds a message load threshold, from a first filtering state to a second filtering state.

3. The method of claim 2, wherein transitioning, based on determining that the message load indicator associated with the flooding attack exceeds the message load threshold, comprises changing operation of a message handling component from the first filtering state to the second filtering state.

4. The method of claim 3, wherein the message load threshold is associated with the second filtering state, and wherein the message load threshold is greater than an additional message load threshold associated with the first filtering state.

5. The method of claim 2, wherein the first filtering state is associated with filtering with a first duty cycle and the second filtering state is associated with filtering with a second duty cycle, the second duty cycle being greater than the first duty cycle.

6. The method of claim 2, wherein determining that the message load indicator associated with the flooding attack exceeds the message load threshold comprises determining that at least one of a utilization of a message handling module exceeds a utilization threshold or an operating temperature of the message handling module exceeds an operating temperature threshold.

7. The method of claim 6, wherein the operating temperature of the message handling module comprises a junction temperature of the message handling module, and wherein the operating temperature threshold comprises a predetermined junction temperature.

8. The method of claim 6, wherein the utilization of the message handling module comprises a numerical correspondence between a verification rate of the message handling module and a verification capacity of the message handling module.

9. The method of claim 6, wherein the utilization of the message handling module is evaluated during listening to messages from the source ID.

10. The method of claim 6, further comprising normalizing the utilization of the message handling module to a total duration of listening to messages from the source ID during an evaluation interval.

11. The method of claim 2, further comprising, prior to determining that the message load indicator associated with the flooding attack exceeds the message load threshold, determining, based on determining that a cumulative messaging rate of a plurality of wireless communication messages comprising the wireless communication message exceeds a cumulative message rate threshold, that the flooding attack is occurring.

12. The method of claim 2, further comprising generating, based on determining that a source-specific message rate associated with the source ID exceeds a source-specific message rate threshold, a filtering list comprising the source ID.

13. The method of claim 2, wherein determining that the message load indicator associated with the flooding attack originating from one or more flooding source IDs of one or more flooding UEs exceeds the message load threshold comprises evaluating the message load indicator over an evaluation interval.

14. The method of claim 13, wherein the evaluation interval comprises a plurality of command intervals.

15. The method of claim 14, wherein enabling filtering comprises ignoring messages from the one or more flooding source IDs and disabling filtering comprises listening to messages from the one or more flooding source IDs, wherein the first filtering state comprises applying different timing offsets to intervals of ignoring messages from the one or more flooding source IDs within individual command intervals of the evaluation interval.

16. The method of claim 15, wherein applying different timing offsets to the intervals of listening to messages from the one or more flooding source IDs within individual command intervals of the evaluation interval comprises listening to messages from the one or more flooding source IDs during different portions of individual command intervals.

17. The method of claim 16, wherein applying different timing offsets to the intervals of ignoring messages from the one or more flooding source IDs within individual command intervals of the evaluation interval comprises cumulatively listening to messages during every timing offset associated with command intervals of the evaluation interval.

18. The method of claim 1, further comprising determining, during intervals of listening to messages from the source ID, that the source ID comprises a cloned source ID.

19. The method of claim 18, further comprising, based on determining that the source ID comprises a cloned source ID, removing the source ID from a filtering list.

20. The method of claim 18, wherein determining that the source ID comprises a cloned source ID comprises identifying that the cloned source ID is associated with a UE based on one or more of historical data, location information, speed, heading, a local database, or crowdsourced information.

21. An apparatus for wireless communication comprising:
a memory; and
one or more processors coupled to the memory and configured to:
obtain a wireless communication message associated with a source ID;
determine the source ID is associated with a flooding attack; and
filter, based on determining that the source ID is associated with a flooding attack, wireless communication messages associated with the source ID, wherein filtering the wireless communication messages comprises alternating between a first filtering state and a second filtering state, wherein the first filtering state and the second filtering state are associated with different amounts of filtering, wherein the first filtering state comprises enabling filtering for a first portion of the first filtering state, disabling filtering for a second portion of the first filtering state, and enabling filtering for a third portion of the first filtering state, wherein the second portion of the first filtering state occurs between the first portion of the first filtering state and the third portion of the first filtering state.

22. The apparatus of claim 21, the one or more processors further configured to:
transition, based on determining that a message load indicator associated with the flooding attack exceeds a message load threshold, from a first filtering state to a second filtering state.

23. The apparatus of claim 22, wherein the first filtering state is associated with filtering with a first duty cycle and the second filtering state is associated with filtering with a second duty cycle, the second duty cycle being greater than the first duty cycle.

24. The apparatus of claim 22, wherein determining that the message load indicator associated with the flooding attack originating from one or more flooding source IDs of one or more flooding UEs exceeds the message load threshold comprises evaluating the message load indicator over an evaluation interval.

25. The apparatus of claim 24, wherein enabling filtering comprises ignoring messages from the one or more flooding source ID and disabling filtering comprises listening to messages from the one or more flooding source IDs, wherein the first filtering state comprises applying different timing offsets to the intervals of ignoring messages from the one or more flooding source IDs within individual command intervals of the evaluation interval.

26. The apparatus of claim 25, wherein applying different timing offsets to the intervals of ignoring messages from the one or more flooding source IDs within individual command intervals of the evaluation interval comprises cumulatively listening to messages during every timing offset associated with command intervals of the evaluation interval.

27. The apparatus of claim 22, wherein to transition, based on determining that the message load indicator associated with the flooding attack exceeds the message load threshold, the one or more processors are further configured to change operation of a message handling component from the first filtering state to the second filtering state.

28. The apparatus of claim 27, wherein the message load threshold is associated with the second filtering state, and wherein the message load threshold is greater than an additional message load threshold associated with the first filtering state.

29. The apparatus of claim 22, wherein determining that the message load indicator associated with the flooding attack exceeds the message load threshold comprises determining that at least one of a utilization of a message handling module exceeds a utilization threshold or an operating temperature of the message handling module exceeds an operating temperature threshold.

30. The apparatus of claim 21, the one or more processors further configured to:
determine, during intervals of listening to messages from the source ID, that the source ID comprises a cloned source ID.

* * * * *